(12) United States Patent
Cammarota et al.

(10) Patent No.: US 9,760,737 B2
(45) Date of Patent: Sep. 12, 2017

(54) TECHNIQUES FOR INTEGRATED CIRCUIT DATA PATH CONFIDENTIALITY AND EXTENSIONS THEREOF

(71) Applicant: QUALCOMM Incorporated, San Diego, CA (US)

(72) Inventors: Rosario Cammarota, San Diego, CA (US); Olivier Jean Benoit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 14/738,251

(22) Filed: Jun. 12, 2015

(65) Prior Publication Data

US 2016/0364582 A1 Dec. 15, 2016

(51) Int. Cl.

| G06F 21/00 | (2013.01) |
|---|---|
| G06F 21/72 | (2013.01) |
| H04L 9/00 | (2006.01) |
| H04L 9/08 | (2006.01) |
| H04L 9/32 | (2006.01) |
| G09C 1/00 | (2006.01) |

(Continued)

(52) U.S. Cl.
CPC ............... *G06F 21/72* (2013.01); *G09C 1/00* (2013.01); *H04L 9/002* (2013.01); *H04L 9/008* (2013.01); *H04L 9/0866* (2013.01); *H04L 9/0894* (2013.01); *H04L 9/3278* (2013.01); H04L 2209/12 (2013.01)

(58) Field of Classification Search
None
See application file for complete search history.

(56) References Cited

U.S. PATENT DOCUMENTS 8,290,150 B2 * 10/2012 Erhart .................... H04L 9/302
380/44
8,595,513 B2 11/2013 Adjedj
(Continued)

FOREIGN PATENT DOCUMENTS

WO 2012113908 A2 8/2012

OTHER PUBLICATIONS

International Search Report and Written Opinion—PCT/US2016/026375—ISA/EPO—dated Jul. 5, 2016—13 pgs.

(Continued)

*Primary Examiner* — Eric Chen
(74) *Attorney, Agent, or Firm* — Hunter Clark PLLC

(57) ABSTRACT

Techniques for protecting data in a processor are provided. An example method according to these techniques includes performing one or more operations on encrypted data using one or more functional units of a data path of the processor to generate an encrypted result. Performing the one or more operations includes: receiving at least one encrypted parameter pair at a functional unit, each encrypted parameter pair comprising an encrypted parameter value and a challenge value associated with the encrypted parameter value, the encrypted parameter being encrypted using a homomorphic encryption technique, the challenge value being used to recover a key used to encrypt the encrypted parameter value, and performing a mathematical computation on the at least one encrypted parameter. The method also includes outputting the encrypted result.

30 Claims, 12 Drawing Sheets

(51) Int. Cl.
*H04L 29/06* (2006.01)
*G06F 11/30* (2006.01)
*G06F 12/14* (2006.01)

(56) References Cited

U.S. PATENT DOCUMENTS

| | | | | |
|---|---|---|---|---|
| 9,214,183 | B2* | 12/2015 | Van Rijnswou | G11B 20/00086 |
| 2004/0022390 | A1* | 2/2004 | McDonald | H04L 9/083 |
| | | | | 380/277 |
| 2007/0044139 | A1* | 2/2007 | Tuyls | G07C 9/00158 |
| | | | | 726/2 |
| 2010/0177898 | A1* | 7/2010 | Tuyls | G06F 21/35 |
| | | | | 380/270 |
| 2012/0124393 | A1* | 5/2012 | Sethumadhavan | G06F 21/76 |
| | | | | 713/190 |
| 2013/0156183 | A1* | 6/2013 | Komano | H04L 9/0866 |
| | | | | 380/44 |
| 2013/0234771 | A1* | 9/2013 | Simons | G06F 7/588 |
| | | | | 327/215 |
| 2014/0241522 | A1 | 8/2014 | Breuer | |
| 2016/0227348 | A1* | 8/2016 | Guo | H04W 4/008 |
| 2017/0048058 | A1* | 2/2017 | Ren | H04L 9/30 |

OTHER PUBLICATIONS

Guin, U., Huang, K., Dimase, D., Carulli, J. M., Tehranipoor, M., & Makris, Y. (Aug. 1, 2014). Counterfeit integrated circuits: a rising threat in the global semiconductor supply chain. Proceedings of the IEEE, 102 (8), 1207-1228. ISSN: 0018-9219, DOI: 10.1109/JPROC.2014.2332291 XP011553686.

Gentry C., et al., "Homomorphic Evaluation of the AES Circuit (Updated Implementation)," Jan. 3, 2015, 35 pages.

* cited by examiner

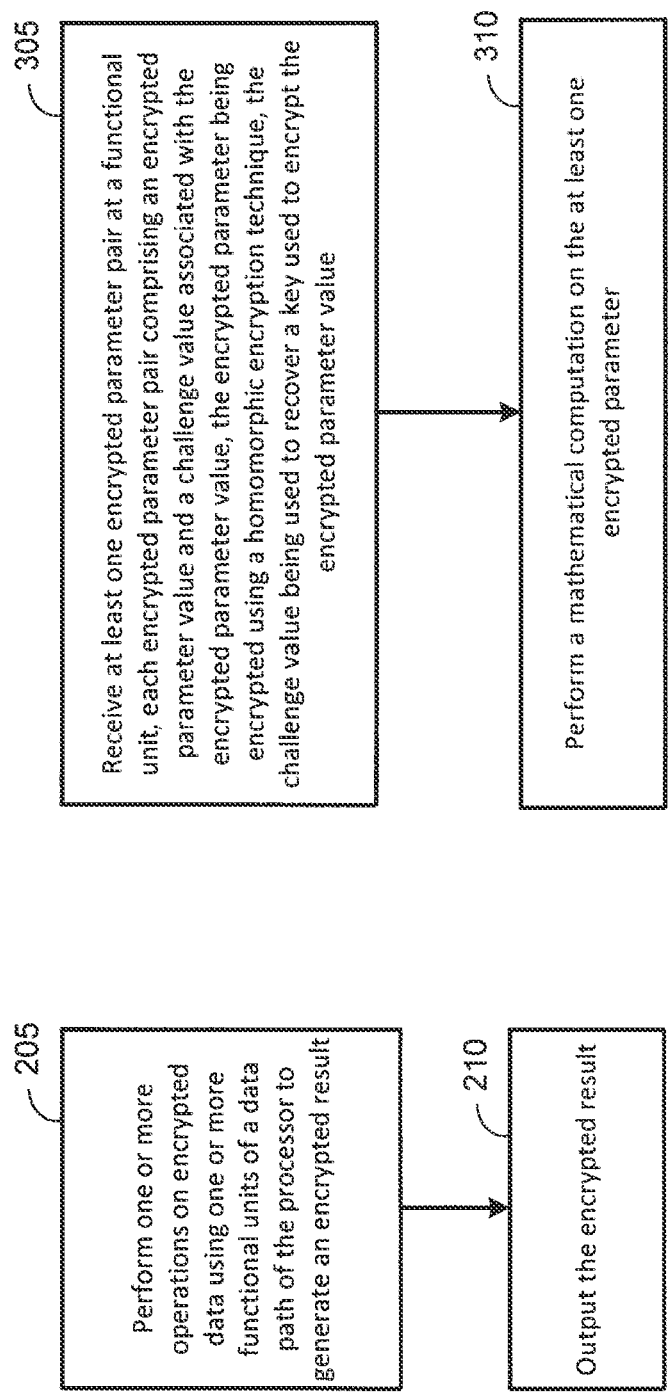

FIG. 3

305 — Receive at least one encrypted parameter pair at a functional unit, each encrypted parameter pair comprising an encrypted parameter value and a challenge value associated with the encrypted parameter value, the encrypted parameter being encrypted using a homomorphic encryption technique, the challenge value being used to recover a key used to encrypt the encrypted parameter value 310 — Perform a mathematical computation on the at least one encrypted parameter 205 — Perform one or more operations on encrypted data using one or more functional units of a data path of the processor to generate an encrypted result 210 — Output the encrypted result

FIG. 2

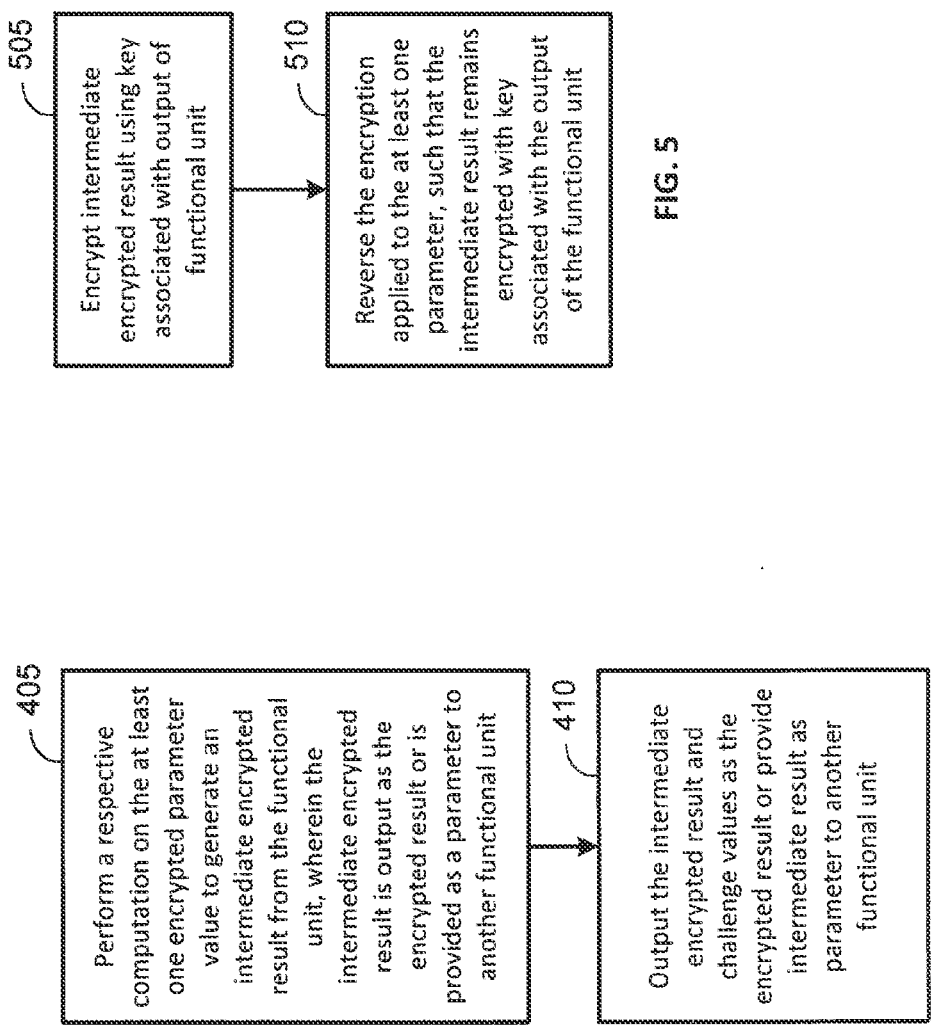

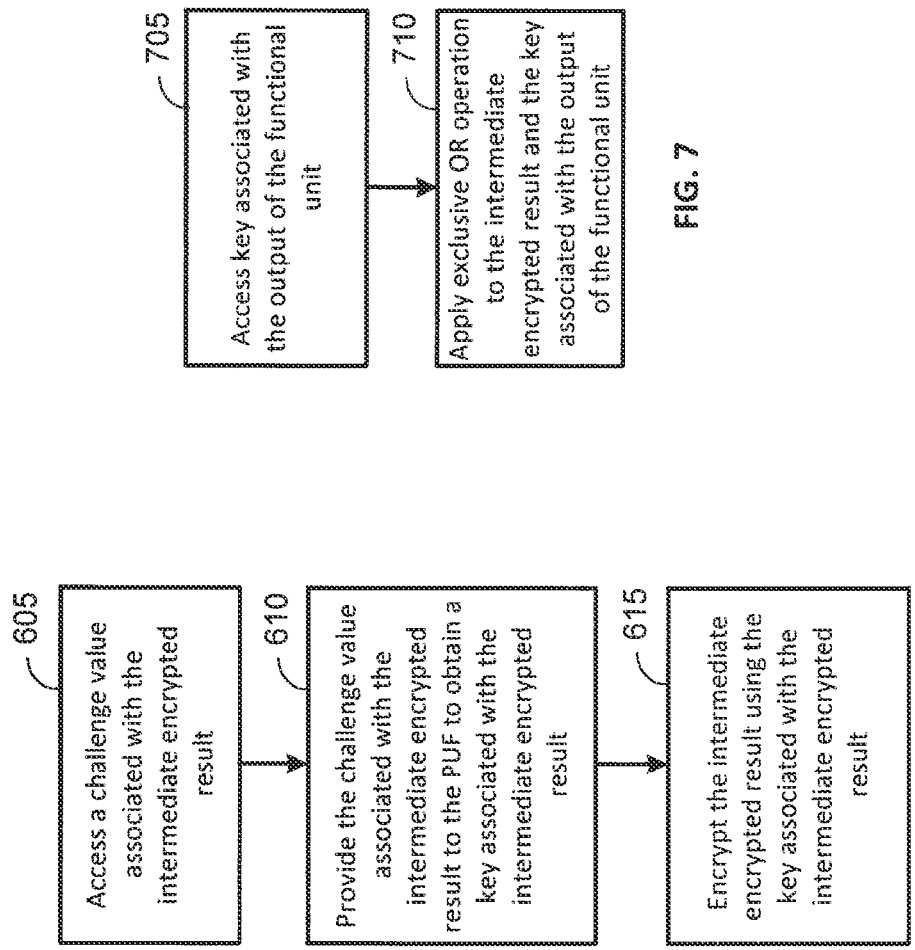

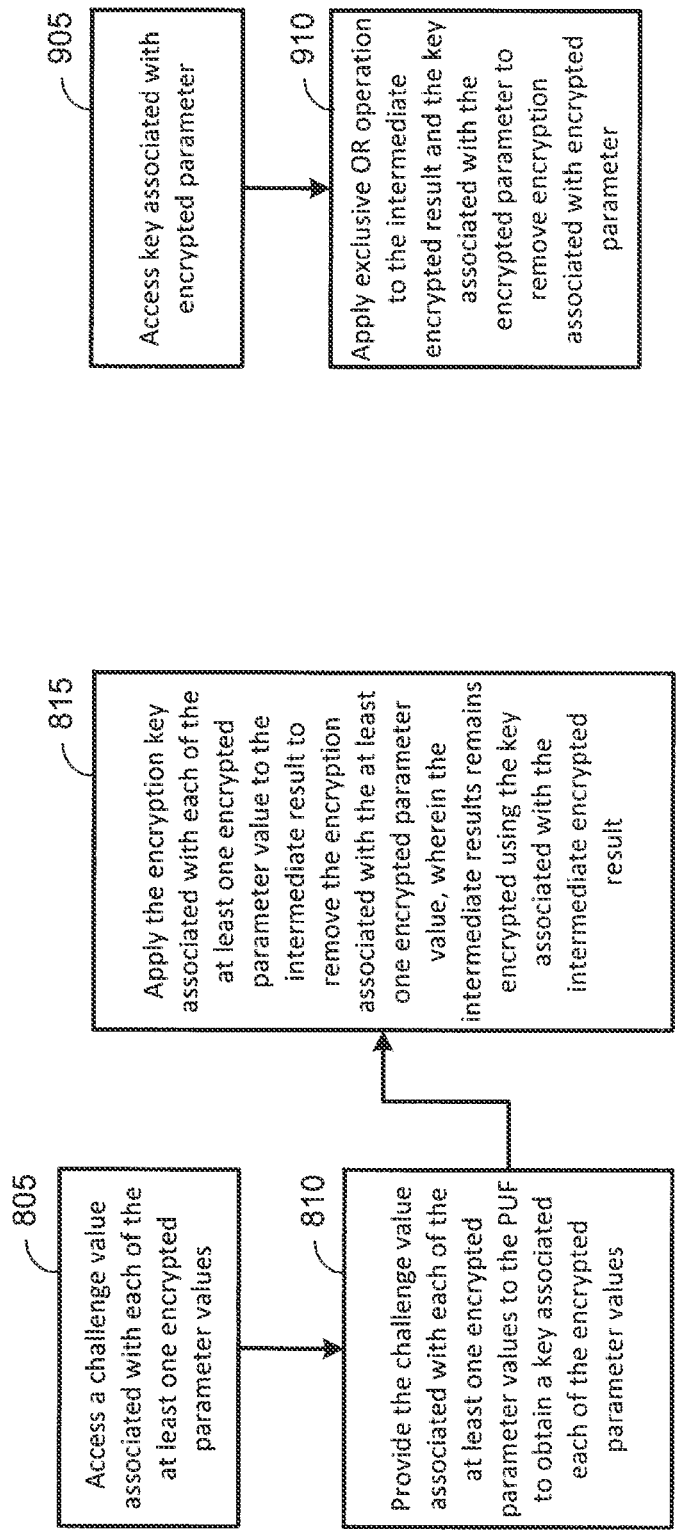

Homomorphic XOR Functional Unit

TECHNIQUES FOR INTEGRATED CIRCUIT DATA PATH CONFIDENTIALITY AND EXTENSIONS THEREOF

BACKGROUND

The contents of memory of computing devices are susceptible to attacks from malicious parties that may attempt to obtain unauthorized access to the contents of the memory of the computing device and/or to gain control of the computing device by assuming control of the flow of program code being executed by a processor of the computing device. Some attempts to encrypt the data stored in the memory of the computing device have been developed that rely on one or more encryption keys that are stored or built in to the processor of the computing device, but such approaches are susceptible to attack and/or reverse engineering in which an attacker can obtain the built-in keys and defeat the encryption provided.

SUMMARY

An example method for protecting data in a processor according to the disclosure includes performing one or more operations on encrypted data using one or more functional units of a data path of the processor to generate an encrypted result. Performing the one or more operations includes receiving at least one encrypted parameter pair at a functional unit, each encrypted parameter pair comprising an encrypted parameter value and a challenge value associated with the encrypted parameter value, the encrypted parameter being encrypted using a homomorphic encryption technique, the challenge value being used to recover a key used to encrypt the encrypted parameter value, and performing a mathematical computation on the at least one encrypted parameter. The method also includes outputting the encrypted result.

Implementations of such a method may include one or more of the following features. The challenge value is used to recover a key used to encrypt the encrypted parameter value from a physically unclonable function (PUF). Encrypting the parameter value of the encrypted parameter pair using a response value obtained from the PUF responsive to providing the challenge value of the encrypted parameter pair to the PUF. Encrypting the parameter value of the encrypted parameter pair using a response value obtained from the PUF includes applying an exclusive or (XOR) operation to an unencrypted parameter value and the response value obtained from the PUF responsive to providing the challenge value to the PUF. Performing a mathematical computation on the at least one encrypted parameter further includes performing a respective computation on the at least one encrypted parameter value to generate an intermediate encrypted result from the functional unit, wherein the intermediate encrypted result is output as the encrypted result or is provided as a parameter to another functional unit. Accessing a challenge value associated with the intermediate encrypted result, and providing the challenge value associated with the intermediate encrypted result to the PUF to obtain a key associated with the intermediate encrypted result. Encrypting the intermediate encrypted result using the key associated with the intermediate encrypted result. Accessing a challenge value associated with each of the at least one encrypted parameter value, and applying the encryption key associated with each of the at least one encrypted parameter value to the intermediate result to remove the encryption associated with the at least one encrypted parameter value, wherein the intermediate results remains encrypted using the key associated with the intermediate encrypted result. Outputting the encrypted result comprises outputting an encrypted result value and a challenge value associated with the encrypted result value. Providing the challenge value associated with the encrypted result value to obtain a response value from the PUF, and decrypting the encrypted result value using the response value obtained from the PUF. Decrypting the encrypted result value using the response value from the PUF includes applying an exclusive or (XOR) operation to the encrypted result value and the response value obtained from the PUF responsive to providing the challenge value to the PUF. Storing the encrypted result value and the challenge value associated with the encrypted result value in a memory associated with the processor.

An example apparatus according to the disclosure includes means for performing one or more operations on encrypted data using one or more functional units of a data path of the processor to generate an encrypted result. The means for performing the one or more operations includes means for receiving at least one encrypted parameter pair at a functional unit, each encrypted parameter pair comprising an encrypted parameter value and a challenge value associated with the encrypted parameter value, the encrypted parameter being encrypted using a homomorphic encryption technique, the challenge value being used to recover a key used to encrypt the encrypted parameter value, and means for performing a mathematical computation on the at least one encrypted parameter. The apparatus also includes means for outputting the encrypted result.

Implementations of such an apparatus may include one or more of the following features. The challenge value is used to recover a key used to encrypt the encrypted parameter value from a physically unclonable function (PUF). Means for encrypting the parameter value of the encrypted parameter pair using a response value obtained from the PUF responsive to providing the challenge value of the encrypted parameter pair to the PUF. The means for encrypting the parameter value of the encrypted parameter pair using a response value obtained from the PUF includes means for applying an exclusive or (XOR) operation to an unencrypted parameter value and the response value obtained from the PUF responsive to providing the challenge value to the PUF. The means for performing a mathematical computation on the at least one encrypted parameter includes means for performing a respective computation on the at least one encrypted parameter value to generate an intermediate encrypted result from the functional unit, wherein the intermediate encrypted result is output as the encrypted result or is provided as a parameter to another functional unit. Means for accessing a challenge value associated with the intermediate encrypted result, and means for providing the challenge value associated with the intermediate encrypted result to the PUF to obtain a key associated with the intermediate encrypted result. Means for encrypting the intermediate encrypted result using the key associated with the intermediate encrypted result. Means for accessing a challenge value associated with each of the at least one encrypted parameter value; and means for applying the encryption key associated with each of the at least one encrypted parameter value to the intermediate result to remove the encryption associated with the at least one encrypted parameter value, wherein the intermediate results remains encrypted using the key associated with the intermediate encrypted result. The means for outputting the encrypted result includes means for outputting an encrypted result value and a challenge value associated with the encrypted result value.

A processor according to the disclosure comprises a memory encryption device and a data path comprising one or more functional units. The memory encryption device is configured to encrypt data using a homomorphic encryption technique. The data path includes one or more functional units configured to perform one or more operations the encrypted data using one or more functional units of a data path of the processor to generate an encrypted result. Each functional unit is configured to implement a mathematical computation on data encrypted using a homomorphic encryption technique and to receive at least one encrypted parameter pair. Each encrypted parameter pair includes an encrypted parameter value and a challenge value associated with the encrypted parameter value.

Implementations of such a processor may include one or more of the following features. The challenge value is used to recover a key used to encrypt the encrypted parameter value from a physically unclonable function (PUF). The functional unit can comprise an Arithmetic Logic Unit (ALU). A respective one of the functional units is configured to encrypt the parameter value of the encrypted parameter pair using a response value obtained from the PUF responsive to providing the challenge value of the encrypted parameter pair to the PUF. The respective one of the functional units being configured to encrypt the parameter value of the encrypted parameter pair using a response value obtained from the PUF is further configured to apply an exclusive or (XOR) operation to an unencrypted parameter value and the response value obtained from the PUF responsive to providing the challenge value to the PUF. The respective one of the functional units is configured to perform a respective computation on the at least one encrypted parameter value to generate an intermediate encrypted result from the functional unit, wherein the intermediate encrypted result is output as the encrypted result or is provided as a parameter to another functional unit. The respective one of the functional units is configured to access a challenge value associated with the intermediate encrypted result, and provide the challenge value associated with the intermediate encrypted result to the PUF to obtain a key associated with the intermediate encrypted result. The respective one of the functional units is configured to encrypt the intermediate encrypted result using the key associated with the intermediate encrypted result. The respective one of the functional units is configured to access a challenge value associated with each of the at least one encrypted parameter value, and apply the encryption key associated with each of the at least one encrypted parameter value to the intermediate result to remove the encryption associated with the at least one encrypted parameter value, wherein the intermediate results remains encrypted using the key associated with the intermediate encrypted result. Each of the one or more functional units is configured to output an encrypted result value and a challenge value associated with the encrypted result value.

An example non-transitory, computer-readable medium, having stored thereon computer-readable instructions for protecting data in a memory according to the disclosure includes instructions configured to cause a computer to receive at least one encrypted parameter pair at a functional unit, each encrypted parameter pair comprising an encrypted parameter value and a challenge value associated with the encrypted parameter value, the encrypted parameter value being encrypted using a homomorphic encryption technique, the challenge value being used to recover a key used to encrypt the encrypted parameter value; perform a mathematical computation on at least one encrypted parameter value of the at least one encrypted parameter pair; and output an encrypted result.

Implementations of such a non-transitory, computer-readable medium may include one or more of the following features. The challenge value is used to recover a key used to encrypt the encrypted parameter value from a physically unclonable function (PUF). Instructions configured to cause the computer to encrypt the parameter value of the encrypted parameter pair using a response value obtained from the PUF responsive to providing the challenge value of the encrypted parameter pair to the PUF. The instructions configured to cause the computer to encrypt the parameter value of the encrypted parameter pair using a response value obtained from the PUF include instructions configured to cause the computer to apply an exclusive or (XOR) operation to an unencrypted parameter value and the response value obtained from the PUF responsive to providing the challenge value to the PUF. The instructions configured to cause the computer to perform a mathematical computation on the at least one encrypted parameter further includes instructions configured to cause the computer to perform a respective computation on the at least one encrypted parameter value to generate an intermediate encrypted result from the functional unit, wherein the intermediate encrypted result is output as the encrypted result or is provided as a parameter to another functional unit. Instructions configured to cause the computer to access a challenge value associated with the intermediate encrypted result and to provide the challenge value associated with the intermediate encrypted result to the PUF to obtain a key associated with the intermediate encrypted result. Instructions configured to cause the computer to encrypt the intermediate encrypted result using the key associated with the intermediate encrypted result. Instructions configured to cause the computer to access a challenge value associated with each of the at least one encrypted parameter value, and instructions configured to cause the computer to apply the encryption key associated with each of the at least one encrypted parameter value to the intermediate result to remove the encryption associated with the at least one encrypted parameter value, wherein the intermediate results remains encrypted using the key associated with the intermediate encrypted result. The instructions configured to cause the computer to output the encrypted result comprise instructions configured to cause the computer to output an encrypted result value and a challenge value associated with the encrypted result value. Instructions configured to cause the computer to provide the challenge value associated with the encrypted result value to obtain a response value from the PUF, and instructions configured to cause the computer to decrypt the encrypted result value using the response value obtained from the PUF. The instructions configured to cause the computer to decrypt the encrypted result value using the response value from the PUF include instructions configured to cause the computer to apply an exclusive or (XOR) operation to the encrypted result value and the response value obtained from the PUF responsive to providing the challenge value to the PUF. Instructions configured to cause the computer to store the encrypted result value and the challenge value associated with the encrypted result value in a memory associated with the processor.

BRIEF DESCRIPTION OF THE DRAWINGS

FIG. 2 is a flow diagram of an example process for protecting data in a processor according to the techniques discussed herein.

FIG. 3 is a flow diagram of an example process for protecting data in a processor according to the techniques discussed herein.

FIG. 4 is a flow diagram of an example process for performing a computation on encrypted data in a processor according to the techniques discussed herein.

FIG. 5 is a flow diagram of an example processing encrypted data in a processor according to the techniques discussed herein.

FIG. 6 is a flow diagram of an example process for encrypting data in a functional unit of a processor according to the techniques discussed herein.

FIG. 7 is a flow diagram of an example encrypting data in a processor according to the techniques discussed herein.

FIG. 8 is a flow diagram of an example process for reversing the encryption on an intermediate result introduced by the input parameter or parameters of a functional unit of a processor according to the techniques discussed herein.

FIG. 9 is a flow diagram of an example process for reversing the encryption on an intermediate result introduced by the input parameter or parameters of a functional unit of a processor according to the techniques discussed herein.

DETAILED DESCRIPTION

Techniques are disclosed for protecting data in the memory of a computing device using a memory encryption device that provides strong protection for data stored in the memory of the computing device. The techniques discussed herein utilize a memory encryption device (MED) to encrypt data before the data is to be stored in the memory of the computing device. The MED of the techniques discussed herein can utilize a Physically Unclonable Function (PUF) module to generate keys to be used by the MED to encrypt the data that is transmitted across the busses and/or stored in the memory of the computing device. The MED can be configured to use a homomorphic encryption technique which allows computations to be carried out on the ciphertext to generate an encrypted result that, when decrypted, matches the results of the same computations performed on the plaintext. The encryption keys are never transmitted across the data bus or stored with the encrypted data or in the chip. Instead, a challenge value is used to obtain a response value from the PUF module which can be used as the encryption key to encrypt a particular set of data. The challenge value is stored with the encrypted data, and the MED can use the challenge value to recover the encryption key that was used to encrypt the encrypted data. Even if an attacker were able to obtain a challenge value associated with a particular portion of the encrypted data, the attacker would only be able to obtain the key associated with that particular challenge-response pair from the PUF. The MED can be configured to use a different challenge for each portion of data to be encrypted. For example, the MED can be configured such that each block of data can be encrypted with a different key provisioned by the PUF module and the challenge to recover this key can be stored with the encrypted block of data in the memory. When the encrypted block of data is required by the processor, the MED can retrieve the encrypted block of data and challenge value from the memory, obtain the encryption key from the PUF by providing the challenge value to the PUF, and decrypt the block of encrypted data.

Example Hardware

Figure 1:
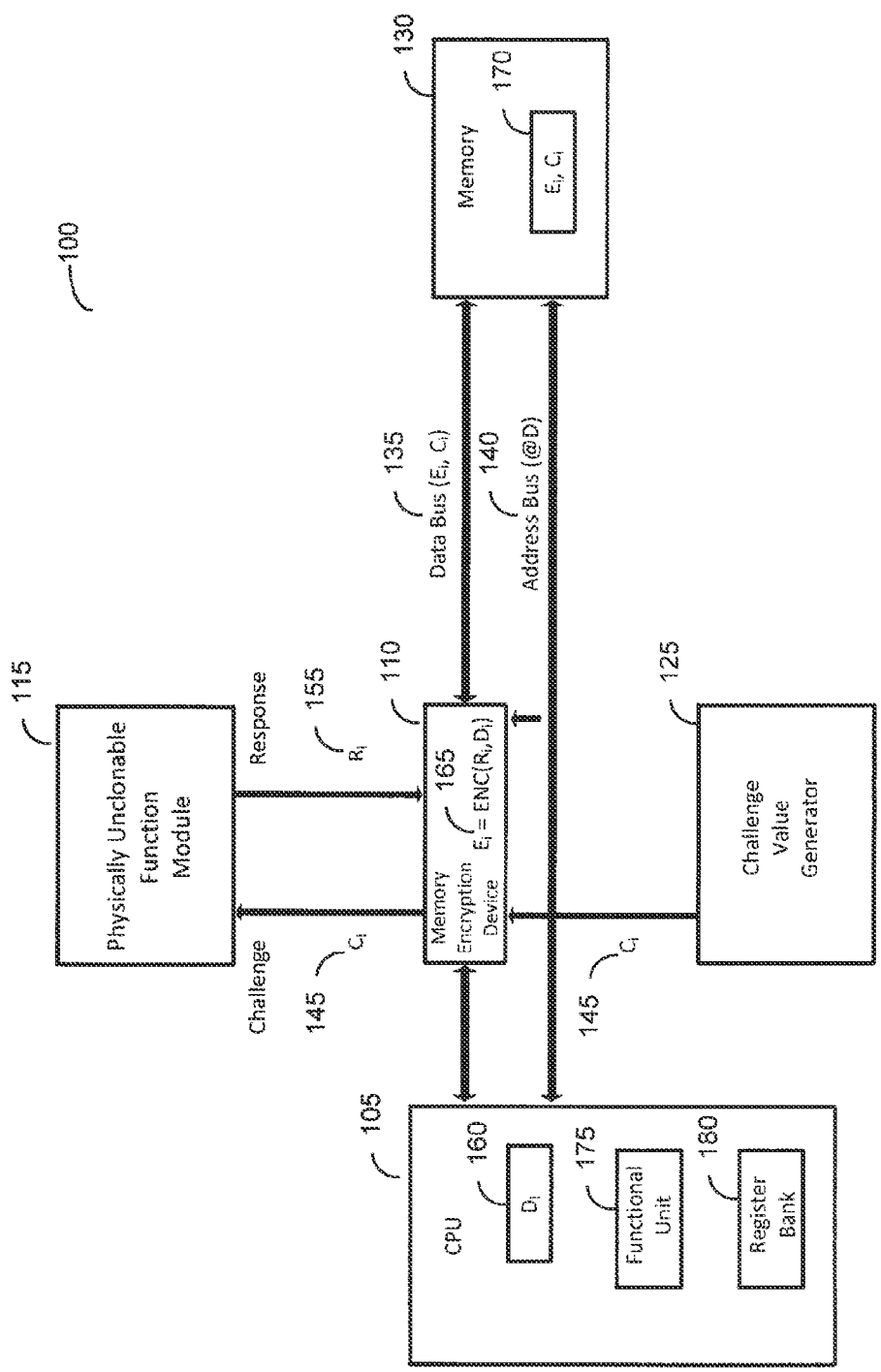
FIG. 1 is a block diagram of a computing device 100 that can be used to implement the techniques disclosed herein.

FIG. 1 is a block diagram of a computing device 100 that can be used to implement the techniques disclosed herein. The computing device can be used to implement, at least in part, the processes illustrated in FIG. 2-10. The computing device 100 comprises a CPU 105, a memory encryption device (MED) 110, a physically unclonable function module 115, a challenge value generator 125, and memory 130. The example computing device 100 illustrated in FIG. 1 is merely an example to illustrate the concepts discussed herein. The techniques discussed herein can be implemented on computing devices that may have additional components not illustrated herein and/or instead of components included in the example illustrated in FIG. 1. The computing device 100 can be implemented as a system on a chip and one or more of the components illustrated in FIG. 1 can be included in the system on a chip. Furthermore, the MED 110, the PUF module 115, and the challenge value generator 125 have each been illustrated as separate components from the CPU 105 for the sake of clarity. However, one or more of the MED 110, PUF module 115, and the challenge value generator 125 can be implemented as components of the CPU 105.

The central processing unit (CPU) 105 comprises electronic circuitry for carrying out computer program instructions. The CPU 105 can comprise components to perform various actions based on computer program instructions include basic arithmetic, logic operations, control operations, and input/output (I/O) operations. The CPU 105 can be configured to receive store instructions which cause the CPU 105 to store data in the memory 130 and read instructions which cause the CPU 105 to retrieve data stored in the memory 130.

The MED 110 can be implemented as part of the CPU 105 can be configured to encrypt data to be stored in the memory 130 and/or sent across the data bus 135, and to store the encrypted data and a challenge value associated with the encrypted data. The MED 110 can implement the encryption and decryption processes illustrated in FIGS. 2-9. The MED 110 can be configured to perform the encryption steps in response to a store data request from the CPU 105, for example, in which the CPU 105 provides the data 160 to the MED 110. The MED 110 can encrypt the data 160 and output encrypted data 165, which can be stored in the memory 130 by sending the encrypted data 165 and the challenge value 145 associated with the encrypted data 165 across the data bus 135 to the memory 130. The encrypted data and the challenge value 145 associated with the encrypted data 165 can be stored at a memory location 170 in the memory 130. In the example illustrated in FIG. 1 there is only a single instance of encrypted data 165 and the challenge value 145 associated with that single instance of encrypted data to simply the illustration of the concepts disclosed herein. However, the MED 110 can store multiple instances of encrypted data 165 and the challenge values associated with each of these instances of encrypted data 165.

The MED 110 can be configured to operate on the data in blocks, such that each block of data is encrypted using a key associated with that particular block of data. The encryption key can be obtained by presenting a challenge value 145 to the PUF module 115 to obtain a response value 155. The MED 110 can use all or a portion of this response value as the encryption key to be used to encrypt the data 160. The MED 110 can be configured to utilize various encryption techniques. For example, the MED 110 can be configured to encrypt the data 160 by applying an exclusive or (XOR) operation to the data 160 and the response value or portion thereof received from the PUF module 115. The use of the XOR algorithm to encrypt the data 160 in this context can provide strong encryption protection for the encrypted data 165, because each block of memory or other segment of memory to be encrypted can be selectively encrypted with a random key using the challenge value 145 provided by the challenge value generator 125 (discussed below) to obtain the encryption key from the PUF module 115. The MED 110 can also be configured utilize other encryption algorithms to encrypt the data 160, such as an Advanced Encryption Standard (AES) algorithm or other encryption algorithm, and is not limited to just the XOR or an AES algorithm.

The MED 110 can also be configured to access encrypted data 165 stored in the memory 130 and the challenge value 145 associated with the encrypted data 165, and to decrypt the encrypted data 165 to recover the data 160, which was the original data before encryption. The MED 110 can perform encryption and the decryption processes illustrated for the functional unit 175 as discussed in FIGS. 7-10 using a homomorphic encryption algorithm. The MED 110 can be configured to perform the decryption steps in response to a read data request from the CPU 105, for example, in which the CPU 105 provides the address of the data to be read to the MED 110. The MED 110 can be configured to access the encrypted data 165 and the challenge value 145 associated with the encrypted data 165 at the memory location 170 in the memory 130. Where the memory location 170 corresponds to the memory location of the data requested in the read data request. The memory location 170 associated with instance of encrypted data 165 stored in the memory 130 will vary for each instance of encrypted data 165 that is stored in the memory 130, as each instance of the encrypted data 165 is written to a separate memory location in the memory 130. The MED 110 can use the challenge value 145 associated with the encrypted data retrieved from the memory location 170 to retrieve the encryption key used to encrypt the encrypted data 165. The MED 110 can provide the challenge value 145 to the PUF 115 to obtain a response value from the PUF module 115. Assuming that the challenge value was not altered or corrupted while in the memory 130, the PUF module 115 should provide a recovered response value that is identical to the response value 155 that was used to encrypt the encrypted data. The MED 110 can select all or a portion of the recovered response value to use as the key to decrypt the encrypted data 165. The MED 110 can be configured to select the same portions of the recovered response value as were selected from the response value 155 and/or to perform the same operations that were performed on the response value 155 to regenerate the key that was used to encrypt the encrypted data 165.

The computing device can also include a challenge value generator 125. The challenge value generator 125 can include a random number generator (RNG) that can be configured to provide a random number to the MED 110, which the MED 110 can use as the challenge value 145 to be presented to the PUF module 115 to obtain a response value 155 which can in turn be used to encrypt the data 160 from the CPU 105. The challenge value generator 125 include a monotonic counter that can provide a unique value each time that the value is read, and the MED 110 can be configured to read a counter value from the monotonic counter which the MED 110 can use as an encryption key for encrypting the data. Other types of challenge value generators can also be used by the MED 110 to generate the challenge value to be presented to the PUF module 115. The size of the challenge value can vary and may be dependent upon the size of the memory 130 for which the data is to be encrypted. The challenge value can include a sufficient number of bits to ensure that each block of the memory 130 can be protected with a unique challenge value.

The PUF module 115 can be implemented utilizing various techniques. In one example implementation, the PUF module 115 can comprise a plurality of ring oscillators. The plurality of ring oscillators (ROs) can be concurrently enabled and their outputs can be sent to two or more switches (multiplexers). A challenge value serves as an input to the switches which causes each switch to then select a single RO from among the plurality of ROs. The challenge value sent to the switches can be designed such that each switch selects a different RO. The selected ROs can each have a slightly different resonating frequency associated with them due to slight manufacturing variations at the semiconductor level even though each may have been manufactured in an attempt to make them identical. The response value 155 can be generated by a pair-wise comparison of these selected ring oscillators' frequencies as measured/stored by a pair of counters. For example, if the first counter detects a higher frequency than the second counter, then a logical "1" may be generated, otherwise a logical "0" may be generated. In this fashion the comparisons made represent a challenge/response mechanism, where the chosen RO pair is the challenge value and the RO frequency comparison result is the response value. The plurality of ring oscillators implementation is merely one example of the types of implementations that could be used to implement the PUF module 115. Other techniques that provide a PUF that is based on physical characteristics of the components of the CPU 105, the memory 130, and/or other components of the computing device 100 that are difficult to predict, easy to evaluate, and reliably provide consistent results can be used to implement the PUF module 115.

The CPU 105 can include a functional unit 175 and a register bank 180. The functional unit 175 can comprise an arithmetic logic unit (ALU) and/or other functional units configured to perform arithmetic and/or bitwise logical operations on integer binary numbers, and can be configured to store data in and access data from the register bank 180. The data 160 encrypted by the MED 110 may be an unencrypted parameter value that the MED 110 can encrypt to generate an encrypted parameter value which can be provided to the functional unit 175.

The functional unit 175 can perform mathematical and/or bitwise operations on encrypted data that has been encrypted using a homomorphic encryption algorithm. The functional unit 175 includes one or more functional blocks that are configured to perform mathematical operations and/or bitwise logical operations on encrypted data. Each functional block of functional unit 175 is configured to implement a mathematical computation. The CPU can include a data path that includes one or more functional units that are configured to perform mathematical operations on encrypted data. The CPU 105 can also include one or more functional units that are configured to perform mathematical operations on unencrypted data. The CPU 105 can be configured to utilize the encrypted processing or the non-encrypted provided by the one or more functional units 175 based on the type of instruction being called. For example, the CPU 105 can be configured to provide both encrypted and unencrypted instructions for at least a portion of the instruction set provided by the CPU 105. An application developer (or the compiler) can then select an appropriate set of instructions to be used in program code to be executed by the CPU 105 depending on whether the execution of the program code should be done using encryption or not using encryption. The CPU 105 can then execute the program code using the appropriate data path. For example, encryption may be desired where the program code is to be processing sensitive data that an attacker may wish to obtain, but the unencrypted processing could be utilized where the program code is to be processing data that is not sensitive and/or the flow of the program is not likely to be circumvented by an attacker in order to obtain control of the computing device 100. Whether to encrypt the data can also be based on power concerns of the computing device 100. The encrypted processing may consume more power than then unencrypted processing, and the CPU 105 can be configured to operate in a low power mode in which the encrypted processing is not utilized in order to conserve power on the computing device 100.

The functional units that are configured to perform mathematical operations on encrypted inputs and to output an encrypted output. The functional units are configured such that the data being worked on remains encrypted throughout the mathematical operation performed by the functional unit to prevent data from being vulnerable to an attacker during processing by the functional unit. The functional units can be configured to utilize homomorphic encryption technique, such as that discussed above with respect to FIG. 1. The functional units can be configured to receive at least one encrypted parameter pair. The encrypted parameter pair can include an encrypted parameter value and a challenge value associated with the encrypted parameter value. The challenge value is the challenge value 145 discussed above, which can be provided to the PUF module 115 in order to obtain the response value 155. The response value 155 can then be used to encrypt the parameter value to generate the encrypted parameter value. Each parameter value can be encrypted using a different key obtained from the PUF module 115 using the technique discussed above.

The functional unit 175 can be configured to perform parts of the processes illustrated in FIGS. 2-9. Example implementations of functional units that can be included in the functional unit 175 are illustrated in FIGS. 10-15. The examples illustrated therein are not meant to be exhaustive, and the functional unit 175 can include other functional units in addition to or instead of one or more of the functional units illustrated in FIGS. 10-15. The functional unit 175 can be configured to maintain the compactness the operands such that the lengths of the ciphertexts do not increase as sequential operations are performed on the data. As discussed above, the CPU 105 can be configured to include more than one functional unit 175 which can implement one or more different types of operations. The example functional units illustrated in FIGS. 1-12 are functional units that can be used in a general purpose data path of the CPU 105. The example functional units illustrated in FIGS. 13-16 are examples of functional units that can be used to perform arithmetic operations in Finite Galois Fields and provide confidentiality to such operations. The Finite Galois Field operations illustrated in these FIGS. 13-16 represent building blocks that can be used to construct various types of block ciphers, including but not limited to Advanced Encryption Standard (AES) algorithms. The inputs of the example functional units illustrated in FIGS. 1-12 can comprise strings of one or more bits. The inputs of the example functional units illustrated in FIGS. 13-16 can comprise elements of Finite Galois Fields of the form $GS(2^n)$, where $n>0$. In other words, the inputs of the functional units illustrated in FIGS. 13-16 have a length that is a power of two, where the power of two is greater than zero.

Example Implementations

FIG. 2 is a flow diagram of an example process for protecting data in a processor according to the techniques discussed herein. The process illustrated in FIG. 2 can be implemented by the computing device 100 illustrated in FIG. 1. The CPU 105 of the computing device 100 can provide means for performing the various stages of the process illustrated in FIG. 2 unless otherwise specified.

One or more operations can be performed on encrypted data using one or more functional units of a data path of the processor to generate an encrypted result (stage 205). The functional unit 175 of the CPU 105 can perform one or more operations on the encrypted data and may be part of a data path that includes one or more functional units. Each functional unit can be configured to perform a particular mathematical operation or bitwise operation on encrypted data and to output an encrypted output. The functional units can be configured to utilize a homomorphic encryption algorithm on the encrypted data and the encrypted parameters received at the functional unit can also be encrypted using a homomorphic encryption algorithm. The functional units can be configured such that the encryption associated with the one or more parameter values received by the functional unit can be reversed after encrypting the encrypted result with a key associated with that result. This approach ensures that the data remains encrypted at all times while in the functional unit and no encrypted data is exposed to potential attackers.

Output the encrypted result (stage 210). The encrypted output can be the output of a functional unit of the CPU 105. The functional unit that outputs the encrypted result may be a final functional unit of a series of functional units that performed operations on the encrypted data to generate the encrypted result.

FIG. 3 is a flow diagram of an example process for protecting data in a processor according to the techniques discussed herein. The process illustrated in FIG. 3 can be used to implement stage 205 of the process illustrated in FIG. 2. The process illustrated in FIG. 3 can be implemented by the computing device 100 illustrated in FIG. 1. The CPU 105 of the computing device 100 can provide means for performing the various stages of the process illustrated in FIG. 3 unless otherwise specified.

At least one encrypted parameter pair can be received at a functional unit, each encrypted parameter pair including an encrypted parameter value and a challenge value associated with the encrypted parameter value. (stage 305) The encrypted parameter is encrypted using a homomorphic encryption technique, and the challenge value can be used to recover a key used to encrypt the encrypted parameter value. Each functional unit 175 of the CPU 105 can be configured to receive one or more encrypted parameter pairs as input. Each encrypted parameter pair includes the encrypted parameter value, which is the encrypted data that is being passed in as a parameter to the functional unit, and a challenge value that can be used to recover the encryption key used to encrypt the encrypted parameter value. The challenge value itself is not the encryption key and cannot be used to decrypt the encrypted parameter value. In the example implementation of the computing device 100 illustrated in FIG. 1, the functional unit 175 of the CPU 105 can be configured to provide the challenge value to the MED 110, and the MED 110 can provide the challenge value to the PUF module 115 in order to obtain a response value. The MED 110 can be configured to receive this response value from the PUF module 115 and to provide the response value 155 to the functional unit 175 of the CPU 105 for use as the decryption key for decrypting the encrypted parameter value. The MED 110 can also be configured to perform one or more operations on the response value 155 to generate the decryption key for the functional unit 175. For example, the MED 110 can be configured to select a predetermined number of bits from the response value 155 to be used as the decryption key. For example, the MED 110 can be configured to select the first X number of bits and the last Y numbers bits from the response value 155, where X and Y are integer values, and X and Y add up to the number of bits of the data 160 to be encrypted. The MED 110 can also be configured to perform other operations on the response value in order to obtain the key. For example, the MED 110 can be configured to apply a modulo operation to the response value to keep the encryption key within a predetermined range or number of bits.

Figure 10:
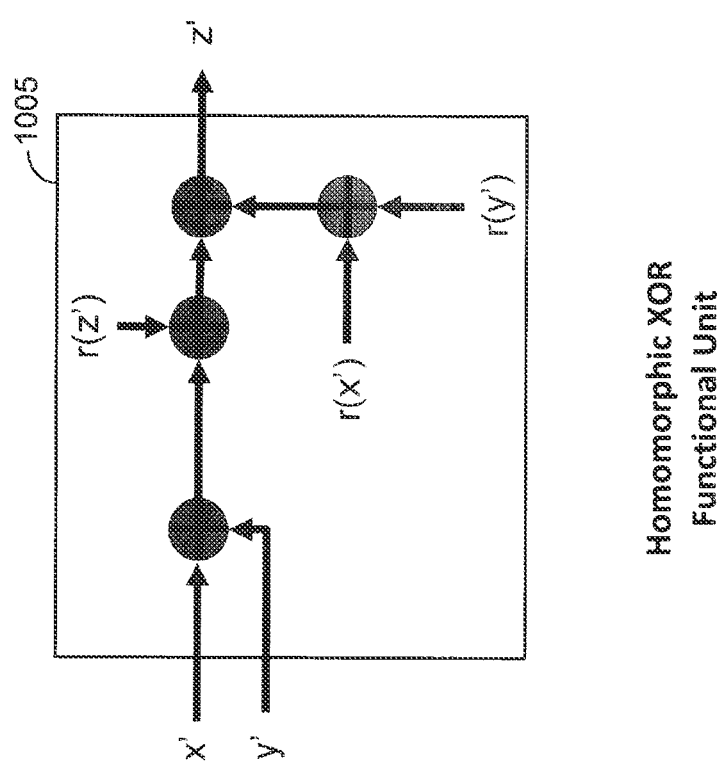
FIG. 10 is a block diagram of a homomorphic XOR functional unit according to the techniques disclosed herein.
Figure 11:
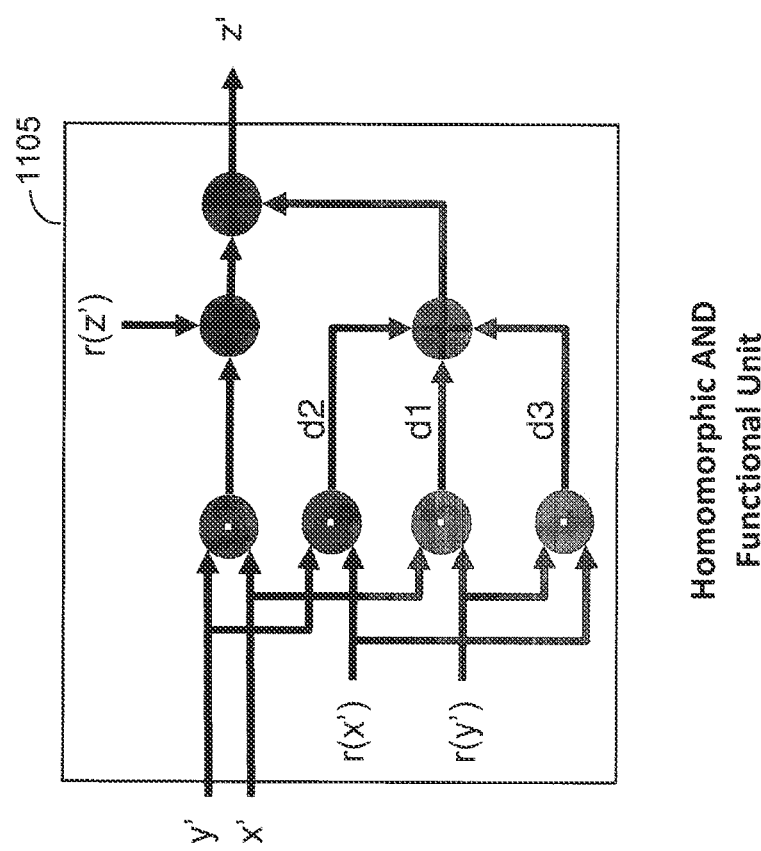
FIG. 11 is a block diagram of a homomorphic AND functional unit according to the techniques disclosed herein.
Figure 12:
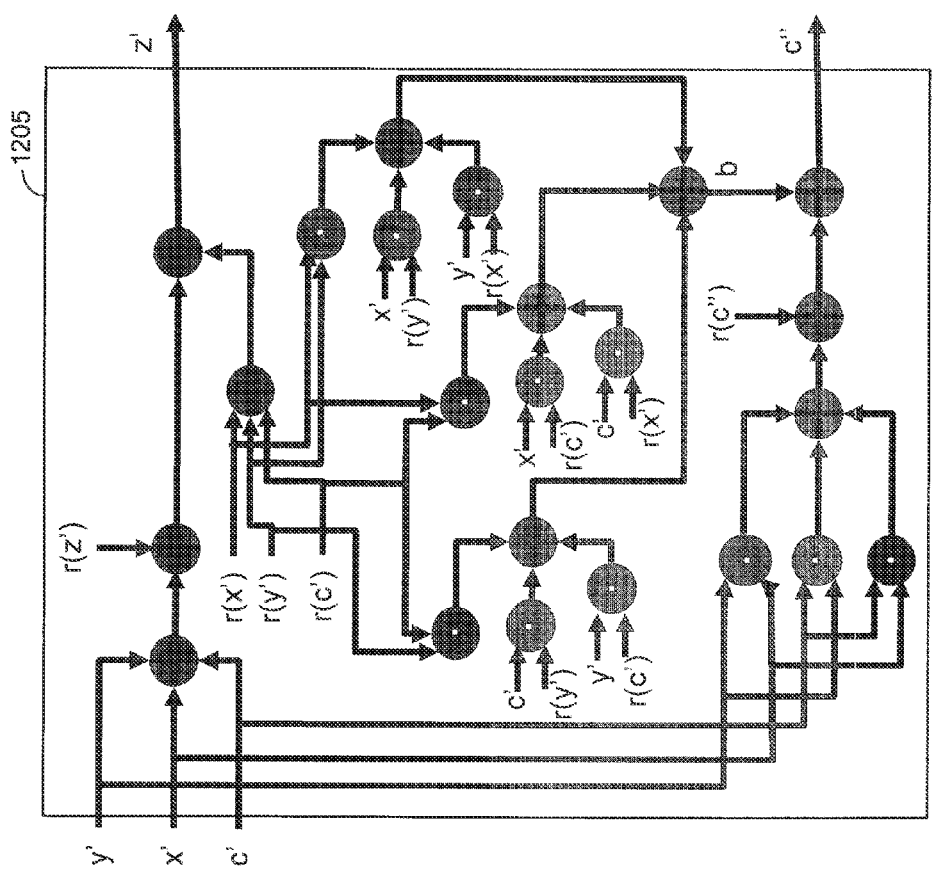
FIG. 12 is a block diagram of a homomorphic ripple-carry adder functional unit according to the techniques disclosed herein.

Perform a mathematical computation on the at least one encrypted parameter (stage 310). The functional unit receiving the at least one encrypted parameter can be configured to perform at least one mathematical operation on the encrypted data. Because the parameter values have been encrypted using a homomorphic encryption algorithm, the functional unit can perform mathematical operations on the encrypted data without rendering the encrypted data unencryptable. FIGS. 10-12 illustrate examples of functional units that can be implemented by the functional unit 175. The examples illustrated in FIGS. 10-12 are examples of some of the types of functional units that may be implemented by the functional unit 175 are not intended to be exhaustive. The CPU 105 may include other functional units in addition to or instead of one or more of the functional units illustrated in FIGS. 10-12.

FIG. 4 is a flow diagram of an example process for performing a computation on encrypted data in a processor according to the techniques discussed herein. The process illustrated in FIG. 4 can be used to implement stage 310 of the process illustrated in FIG. 3. The process illustrated in FIG. 4 can be implemented by the computing device 100 illustrated in FIG. 1. The CPU 105 of the computing device 100 can provide means for performing the various stages of the process illustrated in FIG. 4 unless otherwise specified.

Perform a respective computation on the at least one encrypted parameter value to generate an intermediate encrypted result from the functional unit (stage 405). The functional unit can be configured to receive one or more encrypted parameter on which the functional unit will perform one or more mathematical and/or bitwise operations on the encrypted data. The result of these one or more mathematical and/or bitwise operations includes a layer of encryption introduced by each of the parameters. These layers of encryption can be stripped off prior to outputting the intermediate encrypted result from the functional unit. But, the intermediate encrypted result will first be encrypted using a key associated with the intermediate encrypted result to ensure that the intermediate encrypted results is always maintained in an encrypted state internally within the functional unit. The encryption key associated with the intermediate encrypted result can be obtained from the PUF module 115 of the MED 110. FIG. 5 illustrates an example process for encrypting the intermediate result before reversing the encryption associated with the parameter, which will be discussed in detail below.

Output the intermediate encrypted result and challenge values as the encrypted result or provide intermediate result as parameter to another functional unit (stage 410). The encrypted result output by a functional unit is referred to herein as an intermediate encrypted result, because the functional unit 175 can include multiple functional units configured to perform operations on encrypted data and the intermediate encrypted result output by a particular functional unit may be provided as an input to either the same or another functional unit if more processing is to be done on the intermediate encrypted result. The functional unit 175 can be configured to output the intermediate encrypted result from a functional unit as the encrypted result referred to in stage 210 of the process illustrated in FIG. 2 responsive to the functional unit being the last in a series of functional units to operate on the encrypted data or if the operations performed on the encrypted data on required a single functional unit and that functional unit has output an intermediate encrypted result.

FIG. 5 is a flow diagram of an example processing encrypted data in a processor according to the techniques discussed herein. The process illustrated in FIG. 5 can be used to implement stage 405 of the process illustrated in FIG. 4. The process illustrated in FIG. 5 can be implemented by the computing device 100 illustrated in FIG. 1. The CPU 105 of the computing device 100 can provide means for performing the various stages of the process illustrated in FIG. 5 unless otherwise specified.

The intermediate encrypted result can be encrypted using a key associated with output of functional unit (stage 505). The functional unit 175 can request that the MED 110 provide a new key to be associated with the output of the functional unit. The MED 110 can generate a challenge value 145 and present the challenge value to the PUF module 115 to obtain the response value 155. The MED 110 can be configured to obtain the challenge value from the challenge value generator 125. The MED 110 can also use other techniques for generating the challenge value 145. The MED 110 can also be configured to perform one or more operations on the response value 155 to generate the encryption key for the functional unit 175. For example, the MED 110 can be configured to select a predetermined number of bits from the response value 155 to be used as the encryption key. The MED 110 can be configured to select the first X number of bits and the last Y numbers bits of the response value 155, where X and Y are integer values, and X and Y add up to the number of bits of the data 160 to be encrypted. The MED 110 can also be configured to perform other operations on the response value in order to obtain the key. For example, the MED 110 can be configured to apply a modulo operation to the response value to keep the encryption key within a predetermined range or number of bits.

The encryption applied to the at least one parameter can be reversed, such that the intermediate result remains encrypted with key associated with the output of the functional unit (stage 510). The functional unit 175 can be configured to provide the challenge value 145 associated with each encrypted parameter to the MED 110, and the MED 110 can provide the challenge value 145 associated with each encrypted parameter to the PUF module 115 in order to obtain the response value 155 associated with the challenge value. The MED 110 can be configured to provide each of the respective response values 155 to the functional unit 175, which can in turn provide the respective response values 155 to the appropriate functional unit to use as decryption keys to reverse the encryption on the intermediate value that was introduced by each of the one or more parameters. The MED 110 can also be configured to perform one or more operations on the response value 155 to generate the decryption key for the functional unit 175. For example, the MED 110 can be configured to select a predetermined number of bits from the response value 155 to be used as the decryption key. The MED 110 can be configured to select the first X number of bits and the last Y numbers bits of the response value 155, where X and Y are integer values, and X and Y add up to the number of bits of the data 160 to be decrypted. The MED 110 can also be configured to perform other operations on the response value 155 in order to obtain the decryption key. For example, the MED 110 can be configured to apply a modulo operation to the response value 155 or other such operation to the response value 155 to recover the key that was used to encrypt the encrypted parameter value.

FIG. 6 is a flow diagram of an example process for encrypting data in a functional unit of a processor according to the techniques discussed herein. The process illustrated in FIG. 6 can be used to implement stage 505 of the process illustrated in FIG. 5. The process illustrated in FIG. 6 can be implemented by the computing device 100 illustrated in FIG. 1. The CPU 105 of the computing device 100 can provide means for performing the various stages of the process illustrated in FIG. 6 unless otherwise specified. The process illustrated in FIG. 6 can be used to encrypt the data that is about to be output from a functional unit of the functional unit 175.

Access a challenge value associated with the intermediate encrypted result (also referred to herein as the second challenge value) (stage 605). The functional unit 175 can request that the MED 110 generate a new challenge value associated with the output of the functional unit. The output from the functional unit is a new value and can be encrypted using a newly generated key. Accordingly, the output of the functional unit will be encrypted using a different key than the one or more inputs of the functional unit. This approach provides an added level of security by encrypting the data coming into and coming out of each functional unit with different keys. Even if a single key were to be compromised, the usefulness of this single key would be limited, as the attacker would still lack the keys used to encrypt the parameters and data. The challenge value can be generated by the challenge value generator 125. The MED 110 can be configured to perform one or more operations on the challenge value generated by the challenge value generator 125. For example, the MED 110 can be configured to select a predetermined number of bits from the random number value to be used as the challenge value. For example, the MED 110 can be configured to select the first 4 bits and the last 4 bits of the random number received from the challenge value generator 125. The MED 110 can also be configured to adjust the random number value fall within a predetermined range of challenge values expected by the PUF module 115.

Provide the challenge value associated with the intermediate encrypted result to the PUF to obtain a key associated with the intermediate encrypted result (stage 610). The MED 110 can provide the challenge value to the functional unit 175 and to the PUF module 115. The PUF module 115 can generate a response value 155 to obtain the response value to be used as the encryption key for the intermediate encrypted results. The MED 110 can also be configured to perform one or more operations on the response value 155 to generate the encryption key for the functional unit 175 to be used by the functional unit to encrypt the intermediate encrypted result. For example, the MED 110 can be configured to select a predetermined number of bits from the response value 155 to be used as the encryption key. The MED 110 can be configured to select the first X number of bits and the last Y numbers bits of the response value 155, where X and Y are integer values, and X and Y add up to the number of bits of the data 160 to be encrypted. The MED 110 can also be configured to perform other operations on the response value 155 in order to obtain the encryption key. For example, the MED 110 can be configured to apply a modulo operation to the response value 155 or other such operation to the response value 155 to generate the key to be used encrypt the intermediate encrypted result for the functional unit.

Encrypt the intermediate encrypted result using the key associated with the intermediate encrypted result (stage 615). The encryption key obtained from the MED 110 in stage 610 can be used by the functional unit to encrypt the intermediate encrypted result. The intermediate encrypted result was already encrypted based on the encryption applied to the one or more encrypted parameters from which the intermediate encrypted result is applied. The functional unit encrypts the intermediate encrypted result with the key obtained from the MED 110 before reversing the encryption associated with the one or more parameter values to ensure that the unencrypted form of the data is never present in the functional unit. This approach ensures that an attack on the functional unit of the functional unit 175 of the CPU 105 would not yield the unencrypted data. The functional unit can be configured to apply various types of homomorphic encryption algorithms to encrypt the intermediate result. FIG. 7 provides an example implementation where the functional unit is configured to apply a XOR encryption algorithm to encrypt the intermediate result. The functional unit can also be configured to apply other types of homomorphic encryption algorithms to encrypt the intermediate result.

FIG. 7 is a flow diagram of an example encrypting data in a processor according to the techniques discussed herein. The process illustrated in FIG. 7 can be used to implement stage 615 of the process illustrated in FIG. 6. The process illustrated in FIG. 7 can be implemented by the computing device 100 illustrated in FIG. 1. The CPU 105 of the computing device 100 can provide means for performing the various stages of the process illustrated in FIG. 7 unless otherwise specified.

Access key associated with the output of the functional unit (stage 705). The key provided by the MED 110 in stage 610 can be accessed by the functional unit. The functional unit 175 of the CPU 105 can be configured to receive the key from the MED 110 and to route the key to the appropriate functional unit.

Apply exclusive OR operation to the intermediate encrypted result and the key associated with the output of the functional unit (stage 710). The functional unit can be configured to encrypt the intermediate encrypted result by applying an XOR operation to the intermediate encrypted results and the key associated with the output of the functional unit that was obtained from the MED 110 in stage 705. The functional unit can be configured to then reverse the encryption associated with the one or more parameter values received at the functional unit that were used in determining the intermediate encrypted result value. Examples of such processes are illustrated in FIGS. 8 and 9.

FIG. 8 is a flow diagram of an example process for reversing the encryption on an intermediate result introduced by the input parameter or parameters of a functional unit of a processor according to the techniques discussed herein. The process illustrated in FIG. 8 can be used to implement stage 610 of the process illustrated in FIG. 6. The process illustrated in FIG. 8 can be implemented by the computing device 100 illustrated in FIG. 1. The CPU 105 of the computing device 100 can provide means for performing the various stages of the process illustrated in FIG. 8 unless otherwise specified.

Access a challenge value associated with each of the at least one encrypted parameter values (also referred to herein as the third challenge value) (stage 805). The functional unit 175 can be configured to receive more than one encrypted parameter value and then functional unit 175 can be configured to access the encryption key associated with each respective one of the at least one encrypted parameter value. The functional unit can be configured to receive one or more encrypted parameter pairs that include an encrypted parameter value and a challenge value associated with the encrypted parameter value. The functional unit can be configured to store the challenge values associated with each encrypted parameter in the register bank 180 or in another memory location of the CPU 105 accessible to the functional unit 175. The functional unit can be configured to access the challenge values stored in the register bank 180.

Apply the encryption key associated with each of the at least one encrypted parameter value to the intermediate result to remove the encryption associated with the at least one encrypted parameter value, such that the intermediate results remains encrypted using the key associated with the intermediate encrypted result (stage 810). At this stage, the functional unit has applied the newly acquired encryption key associated with the output of the functional unit to the intermediate result. The functional unit can then reverse the encryption associated with the one or more encrypted parameters by applying the encryption key associated with each encrypted parameter to the intermediate value. The result of this process is that the intermediate encrypted result will now only be encrypted with the key associated with the intermediate encrypted result to be output by the functional unit. Because the MED 110 and the functional units 175 of the CPU 105 are configured to use a homomorphic encryption algorithm to encrypt the data, the order that the encryption steps were untaken to encrypt the parameters utilized to encrypt the one or more parameters does not impose restrictions on the order that the encryption must be reversed. Accordingly, the functional unit can be configured to apply the encryption keys associated with each of the encrypted parameters to the intermediate encrypted result in any order to reverse the encryption associated with the at least one encrypted parameter. FIG. 9 illustrates an example where the functional unit applies an XOR algorithm to the intermediate encrypted result and the encryption key associated with an encrypted parameter in order to reverse the encryption associated with the one or more encrypted parameters from the intermediate encrypted result.

FIG. 9 is a flow diagram of an example process for reversing the encryption on an intermediate result introduced by the input parameter or parameters of a functional unit of a processor according to the techniques discussed herein. The process illustrated in FIG. 9 can be used to implement stage 710 of the process illustrated in FIG. 6. The process illustrated in FIG. 7 can be implemented by the computing device 100 illustrated in FIG. 1. The CPU 105 of the computing device 100 can provide means for performing the various stages of the process illustrated in FIG. 7 unless otherwise specified. The process illustrated in FIG. 9 can be repeated by a functional unit for each encrypted parameter that the functional unit utilized in determining the intermediate encrypted result.

The key associated with and encrypted parameter value can be accessed (stage 905). As discussed above, the functional unit can be configured to store the challenge value associated with an encrypted parameter value in the register bank 180 and to retrieve the challenge value from the register bank 180 in order to obtain the encryption key for the from the MED 110. The functional unit can be configured to temporarily store the encryption key in the register bank 180 before utilizing the key to reverse the encryption on the intermediate encrypted result.

An exclusive OR operation can be applied to the intermediate encrypted result and the key associated with the encrypted parameter to remove encryption associated with encrypted parameter (stage 910). The exclusive OR operation can be applied to the intermediate result and the key associated with the encrypted parameter to reverse the encryption with respect to that parameter. If the functional unit utilizes more than one encrypted parameter, the functional unit will need to repeat this process for each of the encrypted parameters that were used to generate the intermediate encrypted result.

FIG. 10 is a block diagram of a homomorphic XOR functional unit 1005 according to the techniques disclosed herein. The functional unit illustrated in FIG. 10 can be used to implement a functional unit 175 of the CPU 105 illustrated in FIG. 1 and can be used to implement a functional unit in the processes illustrated in FIGS. 2-9. The functional unit illustrated in FIG. 10 is configured to receive two encrypted parameter pairs: an x' parameter pair and a y' parameter and to determine an encrypted output value z'. The x' parameter pair comprises an encrypted value of x' and the challenge value 145 that was used to obtain the response value 155 from the PUF module 115 that was used to determine the encryption key used to encrypt the encrypted value x'. The y' parameter pair comprises an encrypted value of y' and the challenge value 145 that was used to obtain the response value 155 from the PUF module 115 that was used to determine the encryption key used to encrypt the encrypted value y'. In FIG. 10, the annotation r(x') refers the encryption key that was used to encrypt the encrypted value x', and the annotation r(y') refers to the encryption key that was used to encrypt the encrypted value y'.

In the example illustrated in FIG. 10, the encrypted value x' can be determined by the following equation:

$$x' = x \text{ XOR } r(x')$$

where x' represents the encrypted value of the parameter x, x represents the unencrypted parameter value x, and r(x') represents the encryption key used to encrypt the parameter x based on the response from the PUF module to the challenge value associated with the parameter x. Similarly, the parameter value y' can be determined using the following equation:

$$y' = y \text{ XOR } r(y')$$

where y' represents the encrypted value of the parameter y, y represents the unencrypted parameter value y, and r(y') represents the encryption key used to encrypt the parameter y based on the response from the PUF module to the challenge value associated with the parameter y.

The encrypted parameters x' and y' may have been provided by another functional unit of the CPU 105 or may be a set of encrypted parameters that were stored in encrypted form in the memory 130 of the computing device 100 and were accessed by the CPU 105 via the MED 110 in order to perform some computation.

The functional unit 1005 performs an XOR operation on the encrypted parameter value x' and the encrypted parameter value y' to generate an intermediate encrypted result z'.

A correction term is computed using the following equation:

$$d = r(x') \text{ xor } r(y')$$

where d represents then correction value, r(x') represents the encryption key used to encrypt the parameter x, and r(y') represents the encryption key used to encrypt the parameter y. The correction term can be used to reverse the encryption that was introduced to the intermediate encrypted result by the encrypted parameter values x' and y'. This reversal process is slightly different from that illustrated in FIG. 8 above, because the encryption introduced by each of the encrypted parameters is removed all at once by determining the correction term d rather than using the iterative approach illustrated in FIG. 8 where the encryption introduced by each parameter is removed iteratively. The functional units disclosed herein can use either of these approaches to remove the encryption introduced by the encrypted parameters.

The intermediate encrypted result z' can then be determined. The intermediate encrypted result can be encrypted using the encryption key r(z') associated with the encrypted output value z' of the functional unit 1005. The functional unit 1005 can be configured to obtain the encryption key r(z') by presenting a challenge value c(z') to the PUF module 115 in order to obtain the response value r(z'). The functional unit can be configured to obtain a new challenge value from the MED 110, and the MED 110 can be configured to use the challenge value generator 125 to generate the challenge value c(z').

The intermediate encrypted output by the functional unit 1005 can be computed using the following equation:

$$z' = r(z') \text{xor}(x' \text{ xor } y') \text{xor } d$$

where z' is the intermediate encrypted output by the functional unit, r(z') represents the encryption key obtained for the intermediate encrypted output, x' represents the encrypted parameter x, y' represents the encrypted parameter y, and d represents the correction value that can be used to reverse the encryption introduced to the intermediate encrypted output z' by the x' and y' parameters.

The equation $z' = r(z') \text{ xor } (x' \text{ xor } y') \text{ xor } d$ can be simplified to be:

$$z' = (x \text{ xor } y) \text{xor } r(z')$$

The correction value d removes the encryption introduced by the encrypted parameters x' and y' from the intermediate encrypted result while leaving the encryption introduced by the key r(z') associated with the intermediate encrypted result. The functional unit 1005 can output the value z' and the challenge value c(z') that was used to obtain the encryption key r(z').

FIG. 11 is a block diagram of a homomorphic AND functional unit 1105 according to the techniques disclosed herein. The functional unit illustrated in FIG. 11 can be used to implement a functional unit 175 of the CPU 105 illustrated in FIG. 1 and can be used to implement a functional unit in the processes illustrated in FIGS. 2-9. The functional unit illustrated in FIG. 11 is configured to receive two encrypted parameter pairs: an x' parameter pair and a y' parameter and to determine an encrypted output value z'. The x' parameter pair comprises an encrypted value of x' and the challenge value 145 that was used to obtain the response value 155 from the PUF module 115 that was used to determine the encryption key used to encrypt the encrypted value x'. The y' parameter pair comprises an encrypted value of y' and the challenge value 145 that was used to obtain the response value 155 from the PUF module 115 that was used to determine the encryption key used to encrypt the encrypted value y'. In FIG. 11, the annotation r(x') refers the encryption key that was used to encrypt the encrypted value x', and the annotation r(y') refers to the encryption key that was used to encrypt the encrypted value y'.

In the example illustrated in FIG. 11, the encrypted value x' can be determined by the following equation:

$$x' = x \text{ XOR } r(x')$$

where x' represents the encrypted value of the parameter x, x represents the unencrypted parameter value x, and r(x') represents the encryption key used to encrypt the parameter x based on the response from the PUF module to the challenge value associated with the parameter x. Similarly, the parameter value y' can be determined using the following equation:

$$y' = y \text{ XOR } r(y')$$

where y' represents the encrypted value of the parameter y, y represents the unencrypted parameter value y, and r(y') represents the encryption key used to encrypt the parameter y based on the response from the PUF module to the challenge value associated with the parameter y.

The encrypted parameters x' and y' may have been provided by another functional unit of the CPU 105 or may be a set of encrypted parameters that were stored in encrypted form in the memory 130 of the computing device 100 and were accessed by the CPU 105 via the MED 110 in order to perform some computation.

The functional unit 1105 performs an AND operation on the encrypted parameter value x' and the encrypted parameter value y' to generate an intermediate encrypted result z'.

The functional unit 1105 computes three correction terms using the following equations:

$$d1 = x'^{*}r(y')$$

$$d2 = y'^{*}r(x')$$

$$d3 = r(x')^{*}r(y')$$

where d1, d2, and d3 represents the correction values, x' represents the encrypted parameter value x, y' represents the encrypted parameter value y, r(x') represents the encryption key used to encrypt the parameter x, and r(y') represents the encryption key used to encrypt the parameter y. The correction terms d1, d2, and d3 can be used to reverse the encryption that was introduced to the intermediate encrypted result by the encrypted parameter values x' and y'. This reversal process is slightly different from the iterative process illustrated in FIG. 8 above. The functional units disclosed herein can use either of these approaches to remove the encryption introduced by the encrypted parameters.

The intermediate encrypted result z' can then be determined. The intermediate encrypted result can be encrypted using the encryption key r(z') associated with the encrypted output value z' of the functional unit 1105. The functional unit 1105 can be configured to obtain the encryption key r(z') by presenting a challenge value c(z') to the PUF module 115 in order to obtain the response value r(z'). The functional unit can be configured to obtain a new challenge value from the MED 110, and the MED 110 can be configured to use the challenge value generator 125 to generate the challenge value c(z').

The intermediate encrypted output by the functional unit 1105 can be computed using the following equation:

$$z'=r(z')+(x'\cdot y')+d1+d2+d3$$

where z' is the intermediate encrypted output by the functional unit, r(z') represents the encryption key obtained for the intermediate encrypted output, x' represents the encrypted parameter x, y' represents the encrypted parameter y, and d1, d2, and d3 represent the correction values that can be used to reverse the encryption introduced to the intermediate encrypted output z' by the x' and y' parameters.

The correction values d1, d2, and d3 remove the encryption from the intermediate encrypted result introduced by the encrypted parameters x' and y' while leaving the encryption introduced by the key r(z') associated with the intermediate encrypted result. The functional unit 1105 can output the value z' and the challenge value c(z') that was used to obtain the encryption key r(z').

FIG. 12 is a block diagram of a ripple-carry adder functional unit 1205 according to the techniques disclosed herein. The functional unit illustrated in FIG. 12 can be used to implement a functional unit 175 of the CPU 105 illustrated in FIG. 1 and can be used to implement a functional unit in the processes illustrated in FIGS. 2-9. The functional unit illustrated in FIG. 12 is configured to receive three encrypted parameter pairs: an x' parameter pair and a y' parameter which are the protected operands of the adder, c' which is the protected carry, and to determine an encrypted output value z' and a protected carry value c". The x' parameter pair comprises an encrypted value of x' and the challenge value 145 that was used to obtain the response value 155 from the PUF module 115 that was used to determine the encryption key used to encrypt the encrypted value x'. The y' parameter pair comprises an encrypted value of y' and the challenge value 145 that was used to obtain the response value 155 from the PUF module 115 that was used to determine the encryption key used to encrypt the encrypted value y'. In FIG. 12, the annotation r(x') refers the encryption key that was used to encrypt the encrypted value x', and the annotation r(y') refers to the encryption key that was used to encrypt the encrypted value y'. The c' parameter pair comprises the carry value c and the challenge value 145 that was used to obtain the response value 155 from the PUF module 115 that was used to determine the encryption key used to encrypt the encrypted value c'.

In the example illustrated in FIG. 12, the encrypted value x' can be determined by the following equation:

$$x'=x \text{ XOR } r(x')$$

where x' represents the encrypted value of the parameter x, x represents the unencrypted parameter value x, and r(x') represents the encryption key used to encrypt the parameter x based on the response from the PUF module to the challenge value associated with the parameter x. Similarly, the parameter value y' can be determined using the following equation:

$$y'=y \text{ XOR } r(y')$$

where y' represents the encrypted value of the parameter y, y represents the unencrypted parameter value y, and r(y') represents the encryption key used to encrypt the parameter y based on the response from the PUF module to the challenge value associated with the parameter y. Furthermore, the protected carry value c' can be determined using the following equation:

$$c'=c \text{ XOR } r(c')$$

where c' represents the encrypted value of the carry value c', c represents the unencrypted carry value c, and r(c') represents the encryption key used to encrypt the parameter y based on the response from the PUF module to the challenge value associated with the parameter c.

The encrypted parameters x', y', and c' may have been provided by another functional unit of the CPU 105 or may be a set of encrypted parameters that were stored in encrypted form in the memory 130 of the computing device 100 and were accessed by the CPU 105 via the MED 110 in order to perform some computation.

The functional unit 1205 performs an add operation on the encrypted parameter value x', the encrypted parameter value y', and the encrypted carry c' to generate an intermediate encrypted result z' and the encrypted carry c".

A first correction term is computed for the encrypted result z' using the following equation:

$$d=r(x')\text{xor } r(y')\text{xor } r(z')$$

where d represents then correction value, r(x') represents the encryption key used to encrypt the parameter x, and r(y') represents the encryption key used to encrypt the parameter y. The correction term can be used to reverse the encryption that was introduced to the intermediate encrypted result by the encrypted parameter values x' and y'. This reversal process is slightly different from that illustrated in FIG. 8 above, because the encryption introduced by each of the encrypted parameters is removed all at once by determining the correction term d rather than using the iterative approach illustrated in FIG. 8 where the encryption introduced by each parameter is removed iteratively. The functional units disclosed herein can use either of these approaches to remove the encryption introduced by the encrypted parameters.

A second correction term is computed for the protected carry c" using the following equation:

$$b=(r(x') \text{ and } r(y'))\text{xor}(r(x')\& r(c'))\text{xor}(r(y') \text{ and } r(c'))$$

where b represents then correction value, r(x') represents the encryption key used to encrypt the parameter x, r(y') represents the encryption key used to encrypt the parameter y, and r(c') represents the encryption key used to encrypt the carry value c. The correction term can be used to reverse the encryption that was introduced to the carry by the encrypted parameter values x', y', and c'.

The intermediate encrypted output by the functional unit 1205 can be computed using the following equation:

$$z'=x'\text{xor } y' \text{ xor } c' \text{ xor } r(z')\text{xor } d=x \text{ xor } y \text{ xor } c \text{ xor } r(z')$$

where z' is the intermediate encrypted output by the functional unit, r(z') represents the encryption key obtained for the intermediate encrypted output, x' represents the encrypted parameter x, y' represents the encrypted parameter y, and d represent the correction values that can be used to reverse the encryption introduced to the intermediate encrypted output z' by the x', y', and c' parameters.

The correction value d removes the encryption from the intermediate encrypted result introduced by the encrypted parameters x' and y' while leaving the encryption introduced by the key r(z') associated with the intermediate encrypted result. The functional unit 1205 can output the encrypted value z' and the challenge value c(z') that was used to obtain the encryption key r(z').

The protected carry output by the functional unit 1205 can be computed using the following equation:

$$c''=(x' \text{ and } y')\text{xor}(x' \text{ and } c')\text{xor}(y' \text{ and } c')\text{xor } r(c'')\text{xor } b$$

where c" is the encrypted carry value output by the functional unit 1205, r(c") represents the encryption key obtained for the carry output c", x' represents the encrypted parameter x, y' represents the encrypted parameter y, c' represents the encrypted carry parameter c, and b represent the correction value that can be used to reverse the encryption introduced to the carry output c" by the x', y', and c' parameters.

The correction value d removes the encryption from the intermediate encrypted result introduced by the encrypted parameters x' and y' while leaving the encryption introduced by the key r(z') associated with the intermediate encrypted result. The functional unit 1205 can output the encrypted value z' and the challenge value c(z') that was used to obtain the encryption key r(z').

The example functional units illustrated in FIGS. 1-12 are functional units that can be used in a general purpose data path of the CPU 105. The example functional units illustrated in FIGS. 13-16 are examples of functional units that can be used to perform arithmetic operations in Finite Galois Fields and provide confidentiality to such operations. The Finite Galois Field operations illustrated in these FIGS. 13-16 represent building blocks that can be used to construct various types of block ciphers, including but not limited to Advanced Encryption Standard (AES) algorithms. The inputs of the example functional units illustrated in FIGS. 1-12 can comprise strings of one or more bits. The inputs of the example functional units illustrated in FIGS. 13-16 can comprise elements of Finite Galois Fields of the form $GF(2^n)$, where n>0. In other words, the inputs of the functional units illustrated in FIGS. 13-16 have a length that is a power of two, where the power of two is greater than zero.

Figure 13:
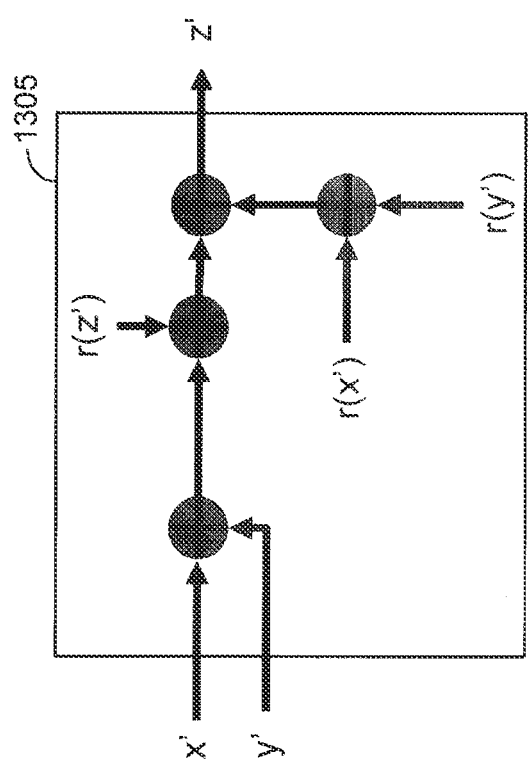
FIG. 13 is a block diagram of a homomorphic XOR unit according to the techniques disclosed herein.

FIG. 13 is a block diagram of a homomorphic XOR functional unit 1305 according to the techniques disclosed herein. The functional unit illustrated in FIG. 13 can be used to implement a functional unit 175 of the CPU 105 illustrated in FIG. 1 and can be used to implement a functional unit in the processes illustrated in FIGS. 2-9. The homomorphic XOR functional unit 1305 is similar to the homomorphic XOR functional unit 1305 illustrated in FIG. 10, except the homomorphic XOR functional unit 1305 can be utilized to perform arithmetic operations on Finite Galois Fields rather than being part of a general data path of the CPU 105 like the functional unit 1005.

The functional unit 1305 illustrated in FIG. 13 is configured to receive two encrypted parameter pairs: an x' parameter pair and a y' parameter and to determine an encrypted output value z'. The x' parameter pair comprises an encrypted value of x' and the challenge value 145 that was used to obtain the response value 155 from the PUF module 115 that was used to determine the encryption key used to encrypt the encrypted value x'. The y' parameter pair comprises an encrypted value of y' and the challenge value 145 that was used to obtain the response value 155 from the PUF module 115 that was used to determine the encryption key used to encrypt the encrypted value y'. In FIG. 13, the annotation r(x') refers the encryption key that was used to encrypt the encrypted value x', and the annotation r(y') refers to the encryption key that was used to encrypt the encrypted value y'.

In the example illustrated in FIG. 13, the encrypted value x' can be determined by the following equation:

$$x'=x \text{ XOR } r(x')$$

where x' represents the encrypted value of the parameter x, x represents the unencrypted parameter value x, and r(x') represents the encryption key used to encrypt the parameter x based on the response from the PUF module to the challenge value associated with the parameter x. Similarly, the parameter value y' can be determined using the following equation:

$$y'=y \text{ XOR } r(y')$$

where y' represents the encrypted value of the parameter y, y represents the unencrypted parameter value y, and r(y') represents the encryption key used to encrypt the parameter y based on the response from the PUF module to the challenge value associated with the parameter y.

The encrypted parameters x' and y' may have been provided by another functional unit of the CPU 105 or may be a set of encrypted parameters that were stored in encrypted form in the memory 130 of the computing device 100 and were accessed by the CPU 105 via the MED 110 in order to perform some computation.

The functional unit 1305 performs an XOR operation on the encrypted parameter value x' and the encrypted parameter value y' to generate an intermediate encrypted result z'.

A correction term is computed using the following equation:

$$d=r(x')\text{xor } r(y')$$

where d represents then correction value, r(x') represents the encryption key used to encrypt the parameter x, and r(y') represents the encryption key used to encrypt the parameter y. The correction term can be used to reverse the encryption that was introduced to the intermediate encrypted result by the encrypted parameter values x' and y'. This reversal process is slightly different from that illustrated in FIG. 8 above, because the encryption introduced by each of the encrypted parameters is removed all at once by determining the correction term d rather than using the iterative approach illustrated in FIG. 8 where the encryption introduced by each parameter is removed iteratively. The functional units disclosed herein can use either of these approaches to remove the encryption introduced by the encrypted parameters.

The intermediate encrypted result z' can then be determined. The intermediate encrypted result can be encrypted using the encryption key r(z') associated with the encrypted output value z' of the functional unit 1305. The functional unit 1305 can be configured to obtain the encryption key r(z') by presenting a challenge value c(z') to the PUF module 115 in order to obtain the response value r(z'). The functional unit can be configured to obtain a new challenge value from the MED 110, and the MED 110 can be configured to use the challenge value generator 125 to generate the challenge value c(z').

The intermediate encrypted output by the functional unit 1305 can be computed using the following equation:

$$z'=r(z')\text{xor}(x' \text{ xor } y')\text{xor } d$$

where z' is the intermediate encrypted output by the functional unit, r(z') represents the encryption key obtained for the intermediate encrypted output, x' represents the encrypted parameter x, y' represents the encrypted parameter y, and d represents the correction value that can be used to reverse the encryption introduced to the intermediate encrypted output z' by the x' and y' parameters.

The equation z'=r(z') xor (x' xor y') xor d can be simplified to be:

$$z'=(x \text{ xor } y) \text{xor } r(z')$$

The correction value d removes the encryption introduced by the encrypted parameters x' and y' from the intermediate encrypted result while leaving the encryption introduced by the key r(z') associated with the intermediate encrypted result. The functional unit 1305 can output the value z' and the challenge value c(z') that was used to obtain the encryption key r(z').

Figure 14:
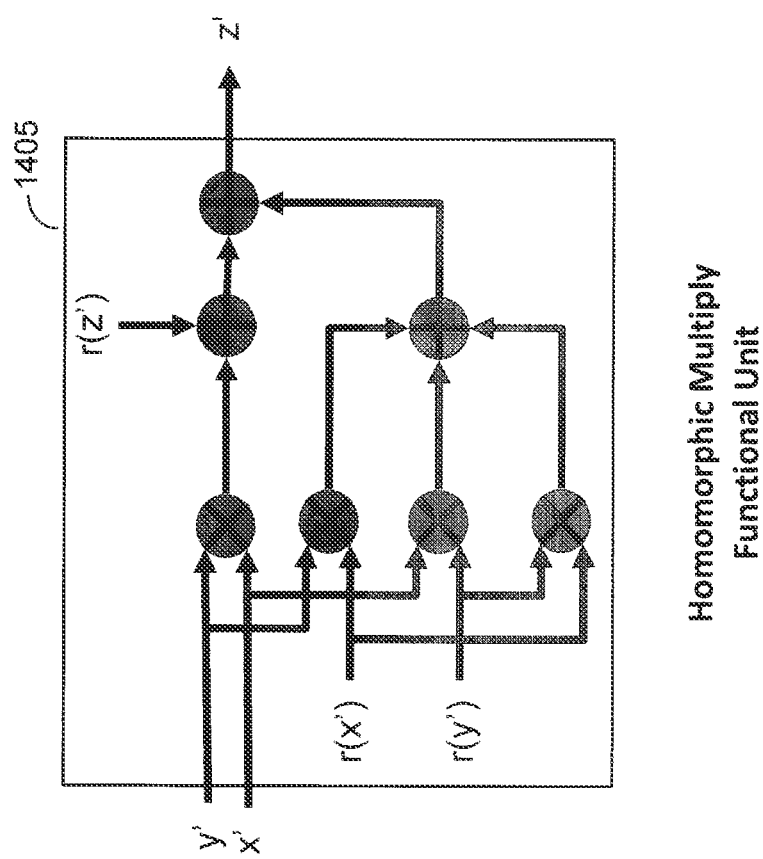
FIG. 14 is a block diagram of a homomorphic multiply functional unit according to the techniques disclosed herein.

FIG. 14 is a block diagram of a homomorphic multiply functional unit 1405 according to the techniques disclosed herein. The functional unit illustrated in FIG. 14 can be used to implement a functional unit 175 of the CPU 105 illustrated in FIG. 1 and can be used to implement a functional unit in the processes illustrated in FIGS. 2-9. The functional unit illustrated in FIG. 14 is configured to receive two encrypted parameter pairs: an x' parameter pair and a y' parameter and to determine an encrypted output value z'. The x' parameter pair comprises an encrypted value of x' and the challenge value 145 that was used to obtain the response value 155 from the PUF module 115 that was used to determine the encryption key used to encrypt the encrypted value x'. The y' parameter pair comprises an encrypted value of y' and the challenge value 145 that was used to obtain the response value 155 from the PUF module 115 that was used to determine the encryption key used to encrypt the encrypted value y'. In FIG. 14, the annotation r(x') refers the encryption key that was used to encrypt the encrypted value x', and the annotation r(y') refers to the encryption key that was used to encrypt the encrypted value y'.

In the example illustrated in FIG. 11, the encrypted value x' can be determined by the following equation:

$$x'=x \text{ XOR } r(x')$$

where x' represents the encrypted value of the parameter x, x represents the unencrypted parameter value x, and r(x') represents the encryption key used to encrypt the parameter x based on the response from the PUF module to the challenge value associated with the parameter x. Similarly, the parameter value y' can be determined using the following equation:

$$y'=y \text{ XOR } r(y')$$

where y' represents the encrypted value of the parameter y, y represents the unencrypted parameter value y, and r(y') represents the encryption key used to encrypt the parameter y based on the response from the PUF module to the challenge value associated with the parameter y.

The encrypted parameters x' and y' may have been provided by another functional unit of the CPU 105 or may be a set of encrypted parameters that were stored in encrypted form in the memory 130 of the computing device 100 and were accessed by the CPU 105 via the MED 110 in order to perform some computation.

The functional unit 1405 performs an AND operation on the encrypted parameter value x' and the encrypted parameter value y' to generate an intermediate encrypted result z'.

The functional unit 1405 computes three correction terms using the following equations:

$$d1=x'*r(y')$$

$$d2=y'*r(x')$$

$$d3=r(x')*r(y')$$

$$d=d1+d2+d3$$

where d1, d2, and d3 represents the correction values, d represents the sum of the correction values d1, d2, and d3, x' represents the encrypted parameter value x, y' represents the encrypted parameter value y, r(x') represents the encryption key used to encrypt the parameter x, and r(y') represents the encryption key used to encrypt the parameter y. The correction terms d can be used to reverse the encryption that was introduced to the intermediate encrypted result by the encrypted parameter values x' and y'. This reversal process is slightly different from the iterative process illustrated in FIG. 8 above. The functional units disclosed herein can use either of these approaches to remove the encryption introduced by the encrypted parameters.

The intermediate encrypted result z' can then be determined. The intermediate encrypted result can be encrypted using the encryption key r(z') associated with the encrypted output value z' of the functional unit 1405. The functional unit 1405 can be configured to obtain the encryption key r(z') by presenting a challenge value c(z') to the PUF module 115 in order to obtain the response value r(z'). The functional unit can be configured to obtain a new challenge value from the MED 110, and the MED 110 can be configured to use the challenge value generator 125 to generate the challenge value c(z').

The intermediate encrypted output by the functional unit 1405 can be computed using the following equation:

$$z'=r(z')+(x'*y')+d$$

where z' is the intermediate encrypted output by the functional unit, r(z') represents the encryption key obtained for the intermediate encrypted output, x' represents the encrypted parameter x, y' represents the encrypted parameter y, and d represents the correction value that can be used to reverse the encryption introduced to the intermediate encrypted output z' by the x' and y' parameters.

The correction value d removes the encryption from the intermediate encrypted result introduced by the encrypted parameters x' and y' while leaving the encryption introduced by the key r(z') associated with the intermediate encrypted result. The functional unit 1405 can output the value z' and the challenge value c(z') that was used to obtain the encryption key r(z').

Figure 15:
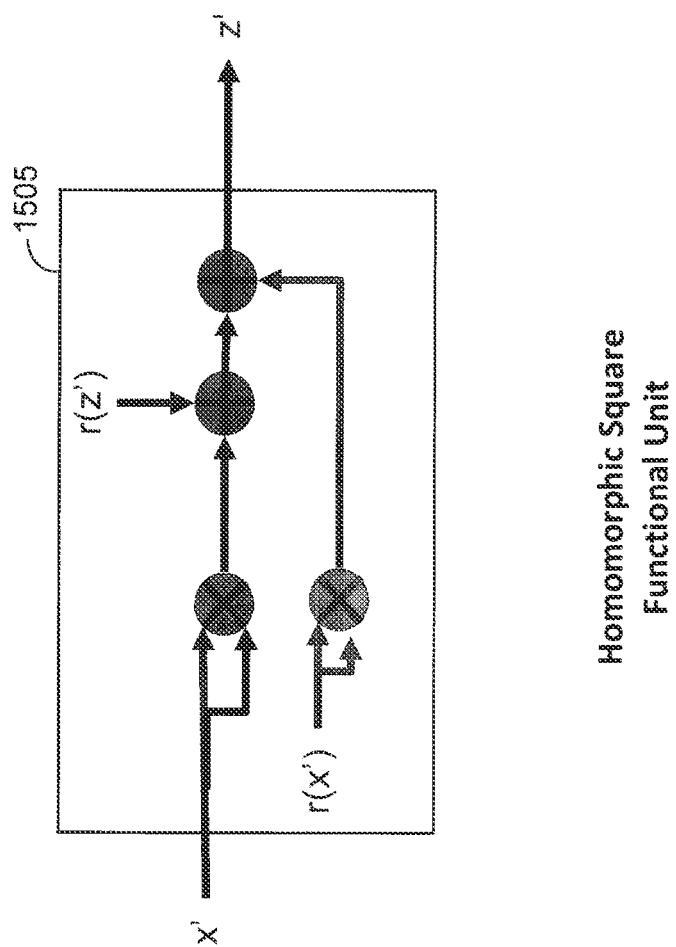
FIG. 15 is a block diagram of a homomorphic square functional unit according to the techniques disclosed herein.

FIG. 15 is a block diagram of a homomorphic square functional unit 1505 according to the techniques disclosed herein. The functional unit illustrated in FIG. 15 can be used to a functional unit 175 of the CPU 105 illustrated in FIG. 1 and can be used to implement a functional unit in the processes illustrated in FIGS. 2-9. The functional unit illustrated in FIG. 15 is configured to receive one encrypted parameter pair: an x' parameter pair and to determine an encrypted output value z' which represents the square of the encrypted parameter x'. The x' parameter pair comprises an encrypted value of x' and the challenge value 145 that was used to obtain the response value 155 from the PUF module 115 that was used to determine the encryption key used to encrypt the encrypted value x'. In FIG. 15, the annotation r(x') refers the encryption key that was used to encrypt the encrypted value x'.

In the example illustrated in FIG. 15, the encrypted value x' can be determined by the following equation:

$$x' = x \text{ XOR } r(x')$$

where x' represents the encrypted value of the parameter x, x represents the unencrypted parameter value x, and r(x') represents the encryption key used to encrypt the parameter x based on the response from the PUF module to the challenge value associated with the parameter x.

A correction term is computed using the following equation:

$$d = r(x')^2$$

where d represents then correction value, and r(x') represents the encryption key used to encrypt the parameter x. The correction term can be used to reverse the encryption that was introduced to the intermediate encrypted result by the encrypted parameter value x'. This reversal process is slightly different from that illustrated in FIG. 8 above, but the functional units disclosed herein can use either of these approaches to reverse the encryption introduced by the encrypted parameters.

The intermediate encrypted result z' can then be determined. The intermediate encrypted result can be encrypted using the encryption key r(z') associated with the encrypted output value z' of the functional unit 1305. The functional unit 1505 can be configured to obtain the encryption key r(z') by presenting a challenge value c(z') to the PUF module 115 in order to obtain the response value r(z'). The functional unit can be configured to obtain a new challenge value from the MED 110, and the MED 110 can be configured to use the challenge value generator 125 to generate the challenge value c(z').

The intermediate encrypted output by the functional unit 1505 can be computed using the following equation:

$$z' = r(z') + (x')^2 + d$$

where z' is the intermediate encrypted output by the functional unit, r(z') represents the encryption key obtained for the intermediate encrypted output, x' represents the encrypted parameter x, and d represents the correction value that can be used to reverse the encryption introduced to the intermediate encrypted output z' by the x' parameter.

The correction value d removes the encryption from the intermediate encrypted result introduced by the encrypted parameters x' while leaving the encryption introduced by the key r(z') associated with the intermediate encrypted result. The functional unit 1505 can output the value z' and the challenge value c(z') that was used to obtain the encryption key r(z').

Figure 16:
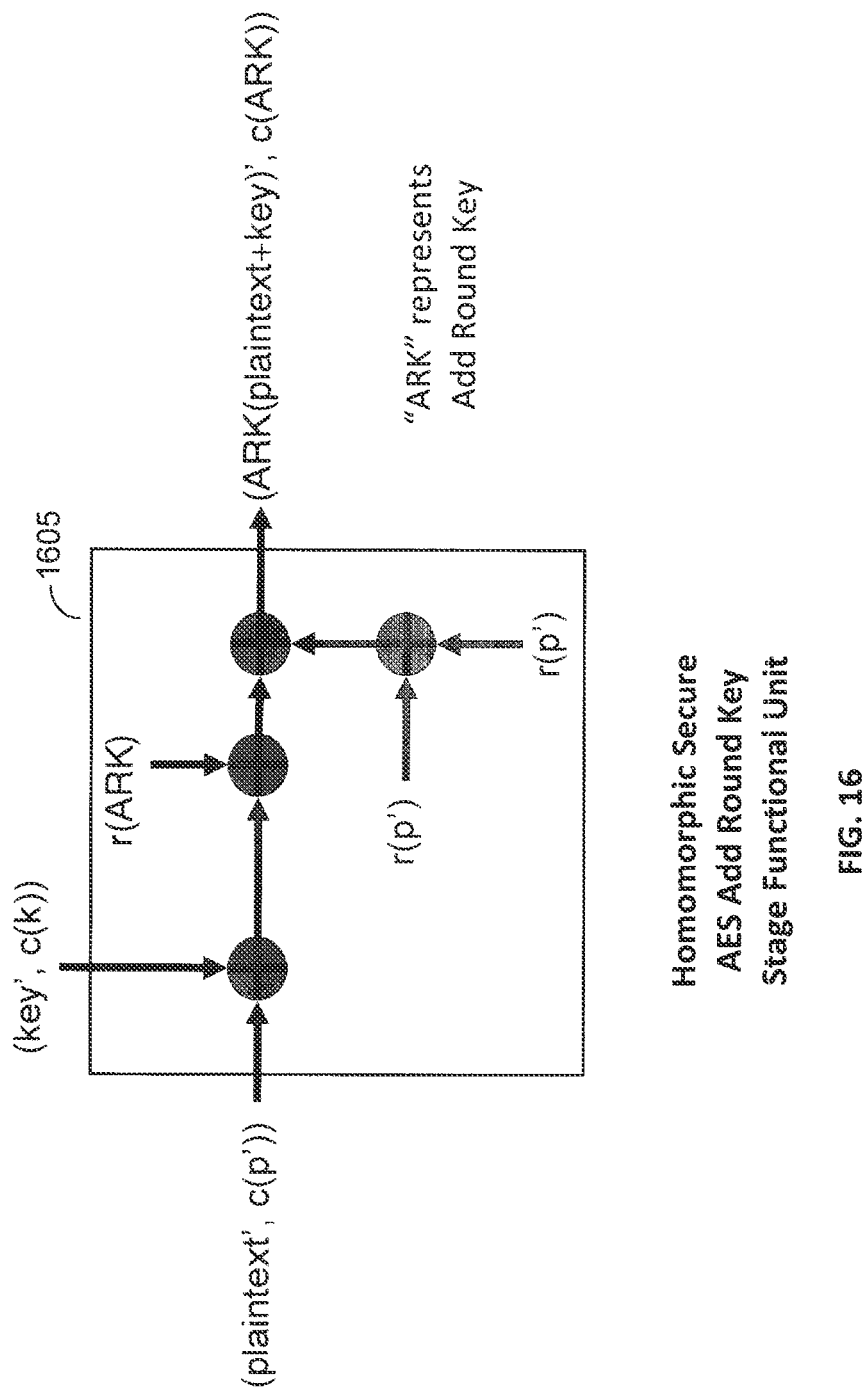
FIG. 16 is a block diagram of a homomorphic secure AES Add Round Key Stage functional unit according to the techniques disclosed herein.

FIG. 16 is a block diagram of a homomorphic secure AES Add Round Key (ARK) Stage functional unit 1605 according to the techniques disclosed herein. The functional units disclosed herein can be used to implement the stages of a block cipher. The example illustrated in FIG. 16 provides an example of a stage of an AES Add Round Key Stage that has been implemented using the techniques disclosed herein. The techniques disclosed herein can also be applied to implement the other stages of the AES algorithm and/or other block cipher algorithms. The functional unit illustrated in FIG. 16 can be used to implement a functional unit 175 of the CPU 105 illustrated in FIG. 1 and can be used to implement a functional unit in the processes illustrated in FIGS. 2-9. The functional unit illustrated in FIG. 16 is configured to receive two encrypted parameter pairs: a plaintext parameter pair and a key parameter pair. The functional unit 1605 is also configured to determine an encrypted output value z' which represents the encrypted results of the AES round. The plaintext parameter pair comprises an encrypted value of the plaintext and the challenge value 145 that was used to obtain the response value 155 from the PUF module 115 that was used to determine the encryption key used to encrypt the encrypted plaintext. The plaintext parameter is referred to as "plaintext" because the AES round would typically receive a text parameter that is the output from another AES round, but the functional unit 1605 implementing the AES round in this example is configured to receive parameters encrypted using a homomorphic encryption technique. The key parameter pair comprises an encrypted encryption key and the challenge value 145 that was used to obtain the response value 155 from the PUF module 115 that was used to determine the encryption key used to encrypt the encrypted encryption key. The key used in a typically AES round would not be encrypted, but the key used by functional block 1105 is encrypted using a homomorphic encryption algorithm according to the techniques disclosed herein. In FIG. 16, the annotation c(p) refers the challenge value that was presented to the PUF module 115 to obtain the encryption key that was used to encrypt the encrypted plaintext (plaintext'), and the annotation c(k) refers to the challenge value that was presented to the PUF module 115 to obtain the encryption key that was used to encrypt the encrypted encryption key (key').

Functional unit 1605 is configured to obtain a challenge value for the Add Round Key stage referred to as "c(ARK)" in FIG. 16. The "ARK" value can comprise a several bit random value, which can be obtained from the challenge value generator 125. The functional unit 1605 is configured to present the ARK value to the PUF module 115 as a challenge value in order to obtain a response value (r(ARK)) that can be used as the encryption key to encrypt the results to be output by the functional unit 1605.

The output value of the functional unit 1605 can be represented by the following equation:

$$\text{ARK}(\text{plaintext} + \text{key})' = (\text{plaintext} + \text{key}) + r(\text{ARK})$$

where plaintext represents the encrypted plaintext parameter, the key represents the encrypted encryption key parameter, and ARK represents the Add Round Key round of processing. The output from the functional unit equals the unencrypted plaintext plus the unencrypted key value plus the encryption key r(ARK) associated with that round of processing. The functional unit 1605 is configured to reverse the encryption that was in was introduced into the result by the encrypted parameter values.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for protecting data in a processor, the method comprising:
performing one or more operations on encrypted data using one or more functional units of a data path of the processor to generate an encrypted result, wherein each functional unit is configured to perform a mathematical computation on at least one encrypted parameter value, to maintain data used to perform or generated by the mathematical computation in an encrypted state, and to generate an intermediate encrypted result, wherein performing the one or more operations comprises
receiving at least one encrypted parameter pair at a functional unit, each encrypted parameter pair comprising an encrypted parameter value and a challenge value associated with the encrypted parameter value, the encrypted parameter value being encrypted using a homomorphic encryption technique, the challenge value being used to recover a key used to encrypt the encrypted parameter value, and
performing the mathematical computation on at least one encrypted parameter value of the at least one encrypted parameter pair using the functional unit; and
outputting the encrypted result.

2. The method of claim 1, wherein the challenge value is used to recover the key used to encrypt the encrypted parameter value from a physically unclonable function (PUF).

3. The method of claim 2, further comprising:
encrypting an unencrypted parameter value to generate the encrypted parameter value of the encrypted parameter pair using a response value obtained from the PUF responsive to providing the challenge value of the encrypted parameter pair to the PUF.

4. The method of claim 3, wherein encrypting the unencrypted parameter value to generate the encrypted parameter value of the encrypted parameter pair using the response value obtained from the PUF comprises applying an exclusive or (XOR) operation to the unencrypted parameter value and the response value obtained from the PUF responsive to providing the challenge value to the PUF.

5. The method of claim 2, wherein performing the mathematical computation on the at least one encrypted parameter value further comprises:
performing a respective mathematical computation on the at least one encrypted parameter value to generate the intermediate encrypted result from the functional unit, wherein the intermediate encrypted result is output as the encrypted result or is provided as a parameter to another functional unit.

6. The method of claim 5, further comprising:
accessing a second challenge value associated with the intermediate encrypted result; and
providing the second challenge value associated with the intermediate encrypted result to the PUF to obtain the key associated with the intermediate encrypted result.

7. The method of claim 6, further comprising:
encrypting the intermediate encrypted result using the key associated with the intermediate encrypted result.

8. The method of claim 7, further comprising:
accessing a third challenge value associated with each of the at least one encrypted parameter value to obtain an encryption key associated with each respective one of the at least one encrypted parameter value;
applying the encryption key associated with each respective one of the at least one encrypted parameter value to the intermediate encrypted result to remove encryption associated with the at least one encrypted parameter value, wherein the intermediate encrypted result remains encrypted using the key associated with the intermediate encrypted result.

9. The method of claim 1, wherein outputting the encrypted result comprises outputting an encrypted result value and the challenge value associated with the encrypted result value.

10. The method of claim 9, further comprising:
providing the challenge value associated with the encrypted result value to obtain a response value from the PUF; and
decrypting the encrypted result value using the response value obtained from the PUF.

11. The method of claim 10, wherein decrypting the encrypted result value using the response value from the PUF comprises applying an exclusive or (XOR) operation to the encrypted result value and the response value obtained from the PUF responsive to providing the challenge value to the PUF.

12. The method of claim 9, further comprising:
storing the encrypted result value and the challenge value associated with the encrypted result value in a memory associated with the processor.

13. An apparatus comprising:
means for receiving at least one encrypted parameter pair at a functional unit, each encrypted parameter pair comprising an encrypted parameter value and a challenge value associated with the encrypted parameter value, the encrypted parameter value being encrypted using a homomorphic encryption technique, the challenge value being used to recover a key used to encrypt the encrypted parameter value, wherein the functional unit is configured to perform a mathematical computation on at least one encrypted parameter value and to generate an intermediate encrypted result;
- means for performing a mathematical computation on at least one encrypted parameter value of the at least one encrypted parameter pair using the functional unit, wherein the means for performing the mathematical computation on the at least one encrypted parameter comprises means for maintaining data used to perform or generated by the mathematical computation in an encrypted from and means for outputting an intermediate encrypted result; and
- means for outputting an encrypted result based at least in part on the intermediate encrypted result.

14. The apparatus of claim 13, wherein the challenge value is used to recover the key used to encrypt the encrypted parameter value from a physically unclonable function (PUF).

15. The apparatus of claim 14, further comprising:
- means for encrypting an unencrypted parameter value to generate the encrypted parameter value of the encrypted parameter pair using a response value obtained from the PUF responsive to providing the challenge value of the encrypted parameter pair to the PUF.

16. The apparatus of claim 15, wherein the means for encrypting the unencrypted parameter value to generate the encrypted parameter value of the encrypted parameter pair using the response value obtained from the PUF comprises means for applying an exclusive or (XOR) operation to the unencrypted parameter value and the response value obtained from the PUF responsive to providing the challenge value to the PUF.

17. The apparatus of claim 14, wherein the means for performing the mathematical computation on the at least one encrypted parameter value further comprises:
- means for performing a respective mathematical computation on the at least one encrypted parameter value to generate the intermediate encrypted result from the functional unit, wherein the intermediate encrypted result is output as the encrypted result or is provided as a parameter to another functional unit.

18. The apparatus of claim 17, further comprising:
- means for accessing a second challenge value associated with the intermediate encrypted result; and
- means for providing the challenge value associated with the intermediate encrypted result to the PUF to obtain an encryption key associated with the intermediate encrypted result.

19. The apparatus of claim 18, further comprising:
- means for encrypting the intermediate encrypted result using the encryption key associated with the intermediate encrypted result.

20. The apparatus of claim 19, further comprising:
- means for accessing a third challenge value associated with each of the at least one encrypted parameter value to obtain an encryption key associated with each respective one of the at least one encrypted parameter value;
- means for applying the encryption key associated with each respective one of the at least one encrypted parameter value to the intermediate encrypted result to remove encryption associated with the at least one encrypted parameter value, wherein the intermediate encrypted result remains encrypted using the key associated with the intermediate encrypted result.

21. The apparatus of claim 13, wherein the means for outputting the encrypted result comprises means for outputting an encrypted result value and the challenge value associated with the encrypted result value.

22. A processor comprising:
- a memory encryption device configured to encrypt data using a homomorphic encryption technique;
- a data path comprising one or more functional units, the one or more functional units each being configured to perform a mathematical computation on at least one encrypted parameter value, to maintain data used to perform or generated by the mathematical computation in an encrypted state, and to generate an encrypted result, the one or more functional units being configured to receive at least one encrypted parameter pair, each encrypted parameter pair comprising an encrypted parameter value and a challenge value associated with the encrypted parameter value, the encrypted parameter value being encrypted using the homomorphic encryption technique, the challenge value being used to recover a key used to encrypt the encrypted parameter value, the one or more functional units being further configured to perform a mathematical computation on at least one encrypted parameter value of the at least one encrypted parameter pair, the data path being configured to output an encrypted result from the one or more functional units of the data path.

23. The processor of claim 22, wherein the challenge value is used to recover the key used to encrypt the encrypted parameter value from a physically unclonable function (PUF).

24. The processor of claim 23, wherein a respective one of the one or more functional units is configured to:
- encrypt an unencrypted parameter value to generate the encrypted parameter value of the encrypted parameter pair using a response value obtained from the PUF responsive to providing the challenge value of the encrypted parameter pair to the PUF.

25. The processor of claim 24, wherein the respective one of the one or more functional units being configured to encrypt the unencrypted parameter value to generate the encrypted parameter value of the encrypted parameter pair using the response value obtained from the PUF is further configured to apply an exclusive or (XOR) operation to the unencrypted parameter value and the response value obtained from the PUF responsive to providing the challenge value to the PUF.

26. The processor of claim 23, wherein the respective one of the one or more functional units is configured to:
- perform a respective mathematical computation on the at least one encrypted parameter value to generate the intermediate encrypted result from the respective one of the one or more functional units, wherein the intermediate encrypted result is output as the encrypted result or is provided as a parameter to another functional unit.

27. The processor of claim 26, wherein the respective one of the one or more functional units is configured to:
- access a second challenge value associated with the intermediate encrypted result; and
- provide the challenge value associated with the intermediate encrypted result to the PUF to obtain an encryption key associated with the intermediate encrypted result.

28. The processor of claim 27, wherein the respective one of the one or more functional units is configured to:
  encrypt the intermediate encrypted result using the key associated with the intermediate encrypted result.

29. A non-transitory, computer-readable medium, having stored thereon computer-readable instructions for protecting data in a memory, comprising instructions configured to cause a computer to:
  receive at least one encrypted parameter pair at a functional unit, each encrypted parameter pair comprising an encrypted parameter value and a challenge value associated with the encrypted parameter value, the encrypted parameter value being encrypted using a homomorphic encryption technique, the challenge value being used to recover a key used to encrypt the encrypted parameter value, wherein the functional unit is configured to perform a mathematical computation on at least one encrypted parameter value;
  perform a mathematical computation on at least one encrypted parameter value of the at least one encrypted parameter pair using the functional unit, wherein the functional unit is configured to perform a mathematical computation on at least one encrypted parameter value, to maintain data used to perform or generated by the mathematical computation in an encrypted state, and to generate an intermediate encrypted result; and
  output an encrypted result based at least in part on the intermediate encrypted result.

30. The non-transitory, computer-readable medium of claim 29, wherein the challenge value is used to recover the key used to encrypt the encrypted parameter value from a physically unclonable function (PUF).

\* \* \* \* \*